(12) United States Patent
Peng

(10) Patent No.: US 12,449,952 B2
(45) Date of Patent: Oct. 21, 2025

(54) INDEX DISPLAY METHOD, ELECTRONIC DEVICE AND COMPUTER-READABLE STORAGE MEDIUM

(71) Applicant: HONOR DEVICE CO., LTD., Shenzhen (CN)

(72) Inventor: Yuzhuo Peng, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/802,061

(22) PCT Filed: Oct. 22, 2021

(86) PCT No.: PCT/CN2021/125873
§ 371 (c)(1),
(2) Date: Aug. 24, 2022

(87) PCT Pub. No.: WO2022/042768
PCT Pub. Date: Mar. 3, 2022

(65) Prior Publication Data
US 2024/0012533 A1 Jan. 11, 2024

(30) Foreign Application Priority Data
Aug. 24, 2020 (CN) .......................... 202010858294.7

(51) Int. Cl.
*G06F 3/00* (2006.01)
*G06F 3/0482* (2013.01)
*G06F 3/04855* (2022.01)
*H04M 1/2747* (2020.01)

(52) U.S. Cl.
CPC ........ *G06F 3/0482* (2013.01); *G06F 3/04855* (2013.01); *H04M 1/2747* (2020.01)

(58) Field of Classification Search
CPC . G06F 3/0482; G06F 3/04855; H04M 1/2747
See application file for complete search history.

(56) References Cited

U.S. PATENT DOCUMENTS 5,828,374 A * 10/1998 Coleman ................. G06F 9/453
715/833
10,635,267 B2 4/2020 Williams
2001/0012007 A1 8/2001 Breuer
(Continued)

FOREIGN PATENT DOCUMENTS

CN 104424233 A 3/2015
CN 104765861 A 7/2015
(Continued)

*Primary Examiner* — Jessica S Manno
*Assistant Examiner* — Andrew Chung
(74) *Attorney, Agent, or Firm* — Fish & Richardson P.C.

(57) ABSTRACT

This application belongs to the field of user interfaces, and provides an index display method, an electronic device, and a computer-readable storage medium. The index display method includes: displaying a first page in response to an operation of a user, where the first page includes a first list, and displaying an index corresponding to the first list when the first list is located in a preset display region of a display interface, so that both the first list and the corresponding index are displayed, thereby improving a degree of matching between an index displayed in the display interface and a list.

15 Claims, 26 Drawing Sheets

(56) References Cited

U.S. PATENT DOCUMENTS

| | | | |
|---|---|---|---|
| 2006/0184901 A1* | 8/2006 | Dietz | G06F 3/04855 |
| | | | 707/E17.093 |
| 2007/0132789 A1 | 6/2007 | Ording | |
| 2011/0022985 A1* | 1/2011 | Ording | G06F 3/0482 |
| | | | 715/830 |
| 2011/0197164 A1* | 8/2011 | Ahn | G06F 3/0488 |
| | | | 715/810 |
| 2012/0036428 A1 | 2/2012 | Tsuda et al. | |
| 2012/0042279 A1* | 2/2012 | Naderi | G06F 16/248 |
| | | | 715/786 |
| 2013/0254707 A1 | 9/2013 | Lambourne et al. | |
| 2014/0149878 A1* | 5/2014 | Mischari | H04M 1/2747 |
| | | | 715/739 |
| 2016/0070425 A1* | 3/2016 | Song | G06F 16/2428 |
| | | | 715/834 |
| 2017/0264959 A1* | 9/2017 | Moon | H04N 21/482 |
| 2019/0064992 A1* | 2/2019 | Tada | H04M 1/2747 |
| 2021/0397308 A1* | 12/2021 | Rahman | H04N 21/47211 |

FOREIGN PATENT DOCUMENTS

| | | | |
|---|---|---|---|
| CN | 107247546 A | 10/2017 | |
| CN | 107273383 A | 10/2017 | |
| CN | 110032673 A | 7/2019 | |
| CN | 110637270 A | 12/2019 | |
| WO | 2020119253 A1 | 6/2020 | |

* cited by examiner

INDEX DISPLAY METHOD, ELECTRONIC DEVICE AND COMPUTER-READABLE STORAGE MEDIUM

CROSS-REFERENCE TO RELATED APPLICATIONS

This application is a National Stage of International Application No. PCT/CN2021/125873, filed on Oct. 22, 2021, which claims priority to Chinese Patent Application No. 202010858294.7, filed on Aug. 24, 2020, both of which are hereby incorporated by reference in their entireties.

TECHNICAL FIELD

This application relates to the field of user interfaces, and in particular, to an index display method, an electronic device, and a computer-readable storage medium.

BACKGROUND

In an existing electronic device, if a display interface displays a list, in order to make it easy for a user to view the list, the display interface generally displays an index. However, according to an existing index display method, the index is generally continuously displayed in the display interface. If the index is continuously displayed in the display interface, the display list may be not displayed in the display interface while the index is displayed, resulting in a problem that the index and the list do not match.

SUMMARY

This application provides an index display method, an electronic device, and a computer-readable storage medium, to improve a degree of matching between a list and an index in a display interface.

To achieve the foregoing objectives, this application uses the following technical solutions:

According to a first aspect, an index display method is provided, including: displaying a first page in response to an operation of a user, where the first page includes a first list; and displaying an index corresponding to the first list when the first list is located in a preset display region of a display interface.

In an embodiment of this application, an electronic device displays the first page in response to the operation of the user, where the first page includes the first list, and the index corresponding to the first list is displayed when the first list is located in the preset display region of the display interface, so that both the first list and the corresponding index are displayed, thereby improving a degree of matching between an index displayed in the display interface and a list.

In a possible implementation of the first aspect, the first page further includes a second list, and the method further includes: when the display interface displays both the first list and the second list, skipping displaying the index. Correspondingly, when the display interface only displays only the first list and the first list is located in the preset display region of the display interface, the index corresponding to the first list is displayed; when the display interface displays only the second list and the second list is located the preset display region of the display interface, an index corresponding to the second list is displayed, so that the index displayed in the display interface corresponds to the list displayed in the display interface.

In a possible implementation of the first aspect, the first page further includes a scroll bar, and the method further includes:
when the display interface displays both the first list and the scroll bar, skipping displaying the index, to prevent the index from obstructing the scroll bar, thereby improving operation convenience for users.

In a possible implementation of the first aspect, before the displaying an index corresponding to the first list, the method further includes: obtaining list information of the first list, and
correspondingly, that the index corresponding to the first list is displayed when the first list is located in the preset display region of the display interface includes: displaying the index corresponding to the first list when the first list is located in the preset display region of the display interface and the list information meets a preset condition. The preset condition is an index use condition. When the list information meets the preset condition, using the index can help a user quickly find a list item. When the list information does not meet the preset condition, displaying the index does not help much in finding a list item, and the index may be not displayed, to save power consumption of an electronic device.

In a possible implementation of the first aspect, the index includes at least one index label, and the list information includes a quantity of index labels corresponding to the first list, and/or a length of the list; and
correspondingly, that the list information meets a preset condition includes:
the quantity of index labels corresponding to the first list is greater than a preset value, and/or the length of the first list is greater than a preset length.

In a possible implementation of the first aspect, the index includes at least one index label, the list includes at least one list item, and the index label corresponds to a list item displayed in the display interface. That is, only the index label corresponding to the list item is displayed in the display interface, which increases a distance between index labels when compared with display of all index labels of an original index, thereby facilitating operations of the user.

In a possible implementation of the first aspect, the index label corresponds to the list item displayed in the display interface and a display status of the display interface, and the display status includes portrait screen display, landscape-screen display, split-screen display, window display, and the like. In the case of landscape display, split-screen display, or window display, an original index cannot be completely displayed on an index display position of the display interface, and only the index label corresponding to the list item displayed in the display interface is displayed. In this way, the index matches the display interface.

In a possible implementation of the first aspect, before the displaying an index corresponding to the first list, the method further includes:
determining an index display position based on a text arrangement format of the first list, where the text arrangement format includes display from left to right and display from right to left; and
correspondingly, the displaying an index corresponding to the first list includes: displaying, at the index display position, the index corresponding to the first list.

According to a second aspect, an index display apparatus is provided, including:

a response module, configured to display a first page in response to an operation of a user, where the first page includes a first list; and a display module, configured to display an index corresponding to the first list when the first list is located in a preset display region of a display interface.

In a possible implementation of the second aspect, the first page further includes a second list, and the display module is further configured to:

when the display interface displays both the first list and the second list, skip displaying the index.

In a possible implementation of the second aspect, the first page further includes a scroll bar, and the display module is further configured to:

when the display interface displays both the first list and the scroll bar, skip displaying the index.

In a possible implementation of the second aspect, the index display apparatus further includes an obtaining module, and the obtaining module is configured to obtain list information of the first list; and correspondingly, the display module is specifically configured to:

display the index corresponding to the first list when the first list is located in the preset display region of the display interface and the list information meets a preset condition.

In a possible implementation of the second aspect, the index includes at least one index label, and the list information includes a quantity of index labels corresponding to the first list, and/or a length of the list; and correspondingly, that the list information meets a preset condition includes:

the quantity of index labels corresponding to the first list is greater than a preset value, and/or the length of the first list is greater than a preset length.

In a possible implementation of the second aspect, the index includes at least one index label, the list includes at least one list item, and the index label corresponds to a list item displayed in the display interface.

In a possible implementation of the second aspect, the index label corresponds to the list item displayed in the display interface and a display status of the display interface.

In a possible implementation of the second aspect, the response module is further configured to:

determining an index display position based on a text arrangement format of the first list, where the text arrangement format includes display from left to right and display from right to left; and correspondingly, the display module is configured to:

display, at the index display position, the index corresponding to the first list.

According to a third aspect, an electronic device is provided, including a processor. The processor is configured to execute a computer program stored in a memory, to implement the index display method according to the foregoing first aspect.

According to a fourth aspect, a computer-readable storage medium is provided, where the computer-readable storage medium stores a computer program. When the computer program is executed by a processor, the index display method according to the foregoing first aspect is implemented.

According to a fifth aspect, a computer program product is provided. When the computer program product is run on a terminal device, the terminal device is enabled to perform the index display method according to the foregoing first aspect.

It can be understood that, for beneficial effects of the foregoing second aspect to fifth aspect, reference may be made to related descriptions in the foregoing first aspect. Details are not described herein again.

DESCRIPTION OF EMBODIMENTS

In the following description, for the purpose of illustration rather than limitation, specific details such as specific system structures and technologies are proposed, to help have a thorough understanding of embodiments of this application. However, a person skilled in the art shall understand that this application may be implemented in other embodiments without these specific details. In other cases, detailed descriptions about well-known systems, apparatuses, circuits, and methods are omitted, to prevent unnecessary details from obscuring descriptions of this application.

It should be understood that, when used in this specification of this application and the appended claims, the term "include" or "comprise" indicates the presence of the described characteristic, whole, step, operation, element, and/or component, but does not exclude presence or addition of one or more other characteristics, w % holes, steps, operations, elements, components, and/or sets thereof.

It should be further understood that, the term "and/or" used in this specification of this application and the appended claims refers to and includes any combination or all possible combinations of one or more of the associated listed items.

As used in the specification of this application and the appended claims, the term "if" may be interpreted, depending on the context, as "when . . . " or "once" or "in response to determining" or "in response to detecting". Similarly, the phrases "if it is determined" or "if the [described condition or event] is detected" may be interpreted, depending on the context, as "once it is determined" or "in response to determining" or "once the [described condition or event] is detected" or "in response to detection of the [described condition or event]".

In addition, the terms "first", "second", and the like in the description of this application are merely used for the purpose of distinguishing description, and cannot be understood as indicating or implying relative importance.

Referring to "an embodiment" or "some embodiments" or the like described in this specification of this application means that a particular feature, structure, or characteristic described with reference to one or more embodiments of this application is included in the embodiment. Therefore, the phrases "in an embodiment," "in some embodiments," "in some other embodiments," "in another embodiment," and the like appearing in various places in this specification do not necessarily mean same embodiments, but mean "one or more but not all of embodiments" unless specifically emphasized otherwise. The terms "include", "comprise", "have" and their variants mean "including but not limited to" unless specifically emphasized otherwise.

The following describes in detail embodiments of this application.

Figure 1A:
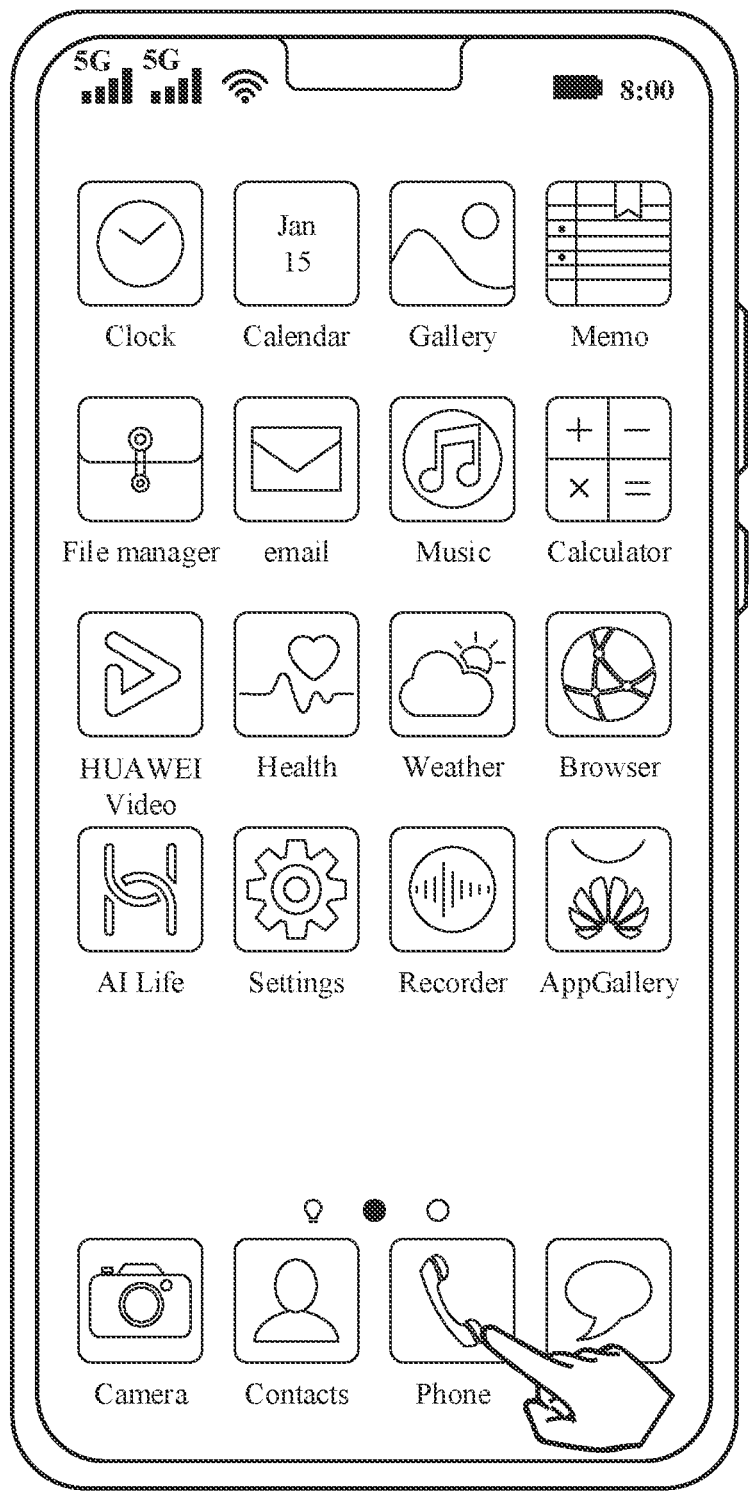
FIG. 1(A) and FIG. 1(B) are diagrams of an application scenario of an index display method according to an embodiment of this application.
Figure 1A:
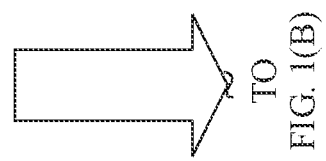
Figure 1B:
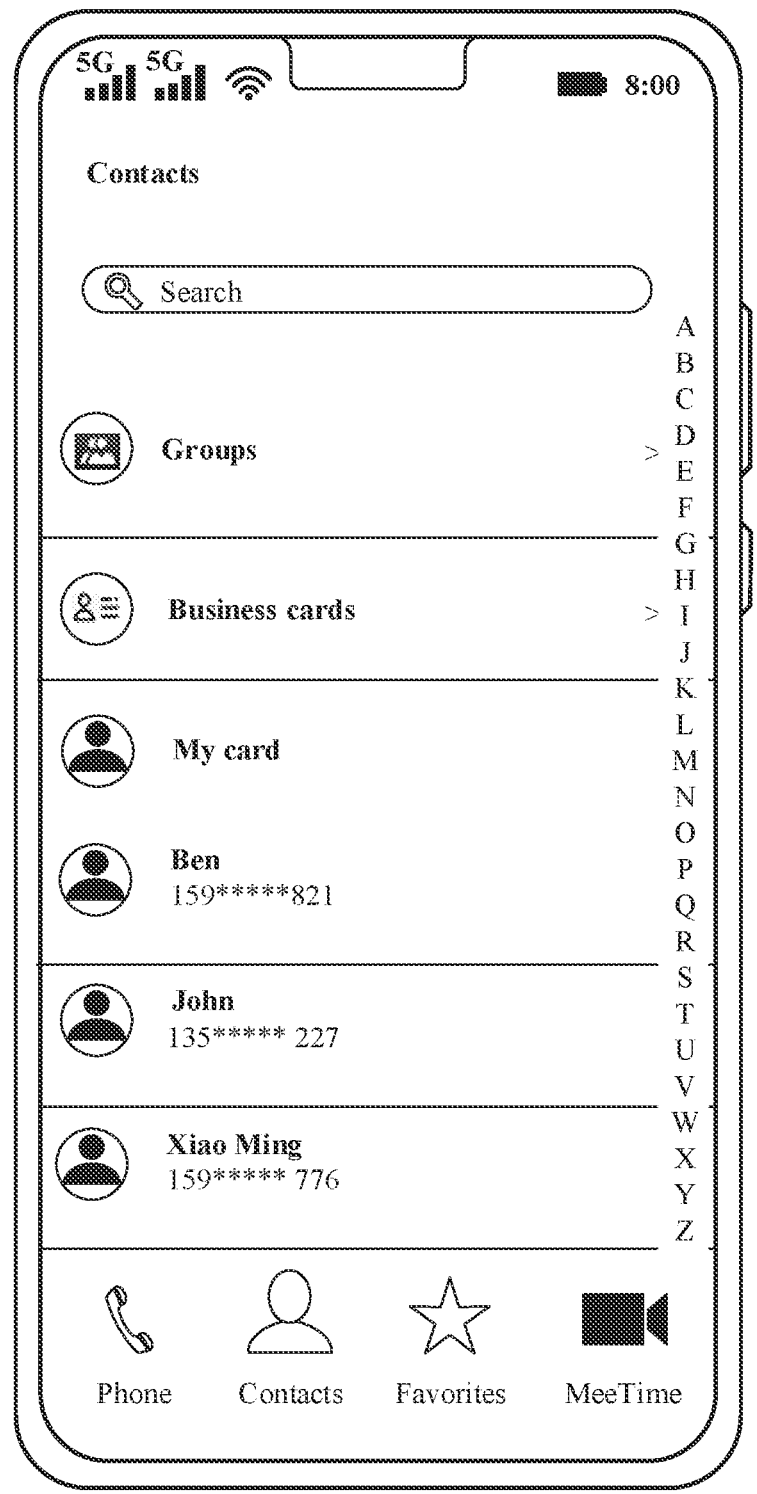
Figure 2:
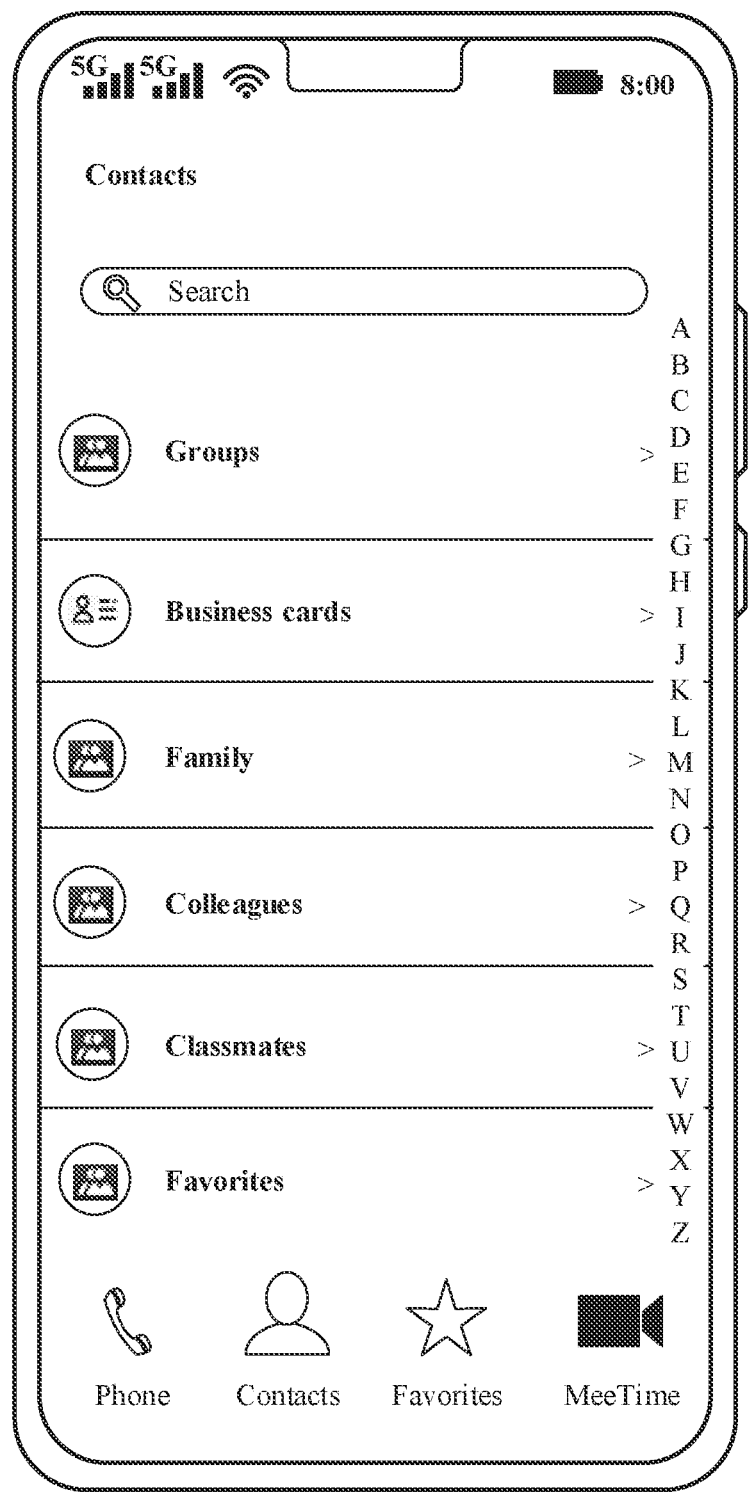
FIG. 2 is a diagram of another application scenario of an index display method according to an embodiment of this application.

Currently, when displaying a list, an electronic device displays an index corresponding to the list in a display interface. For example, as shown FIG. 1(A), the electronic device opens a contacts page shown in FIG. 1(B) in response to a touch operation of a user on a "Phone" control. The contacts page includes a business card list "My card", and an index "ABCDEFGHIGKLMNOPQRSTUVWXYZ" corresponding to "My card". The business card list includes list items such as "Ben", "John", and "Xiao Ming". Each letter in the index is an index label. The user can search, based on an index label, for a list item corresponding to the index label. The contacts page generally includes not only the business card list, but also some folder options. For example, as shown in FIG. 1(B), above the business card list, the contacts page further includes folder options such as "Groups" and "Business cards". These folder options do not match the index displayed in the current display interface. Especially when a quantity of specified folder options is relatively large, a problem that the business card list and the index are not displayed at the same time is caused. For example, as shown in FIG. 2, in an application scenario, a length of the folder options on the contacts page is greater than a length of the display interface. When the contacts page is slid to a position shown in FIG. 2, the business card list is not displayed in the display interface, but the index corresponding to the business card list is displayed, resulting in a problem that the index and the business card list do not match.

Figure 3A:
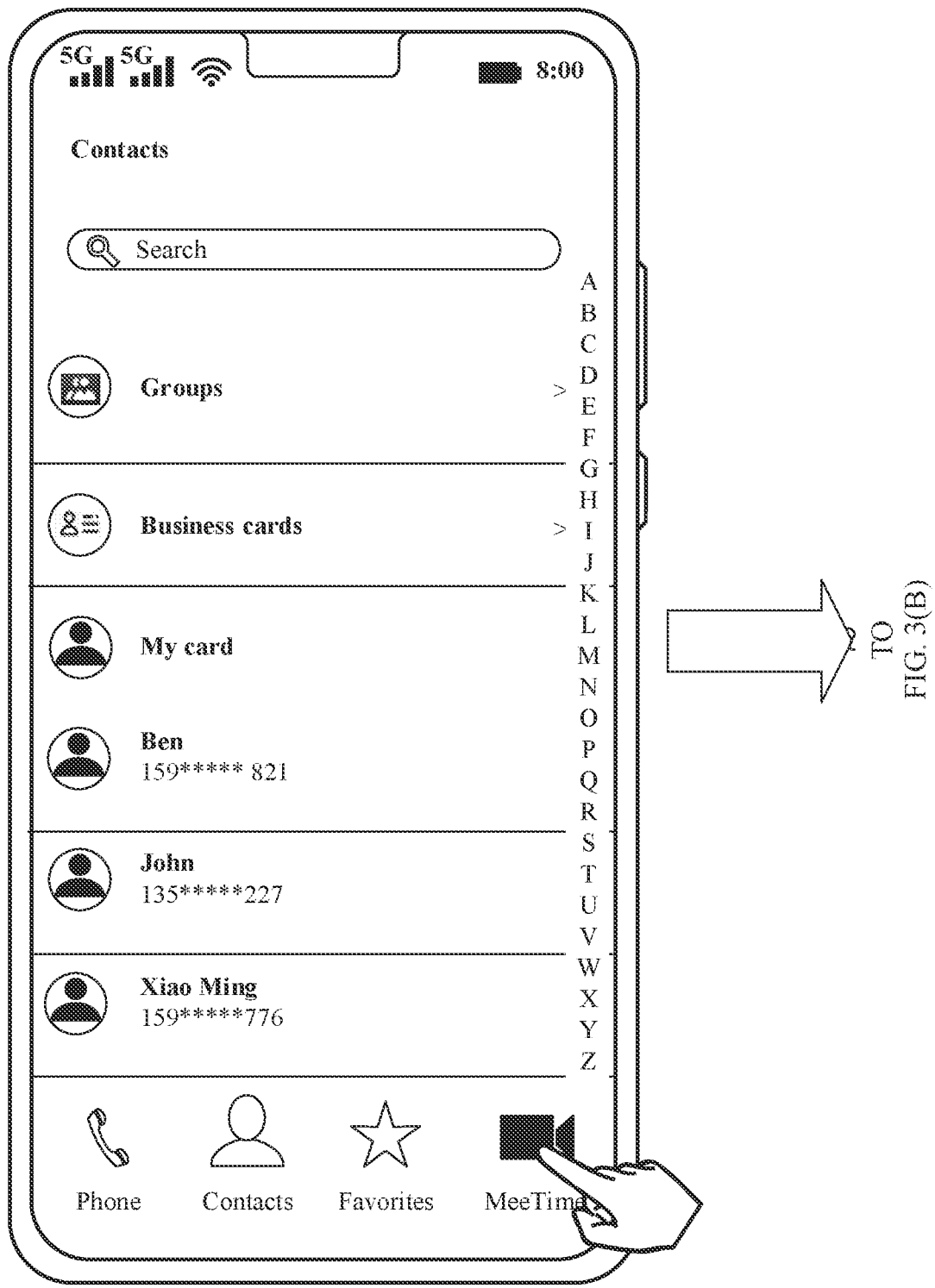
FIG. 3(A) and FIG. 3(B) are diagrams of still another application scenario of an index display method according to an embodiment of this application.
Figure 3B:
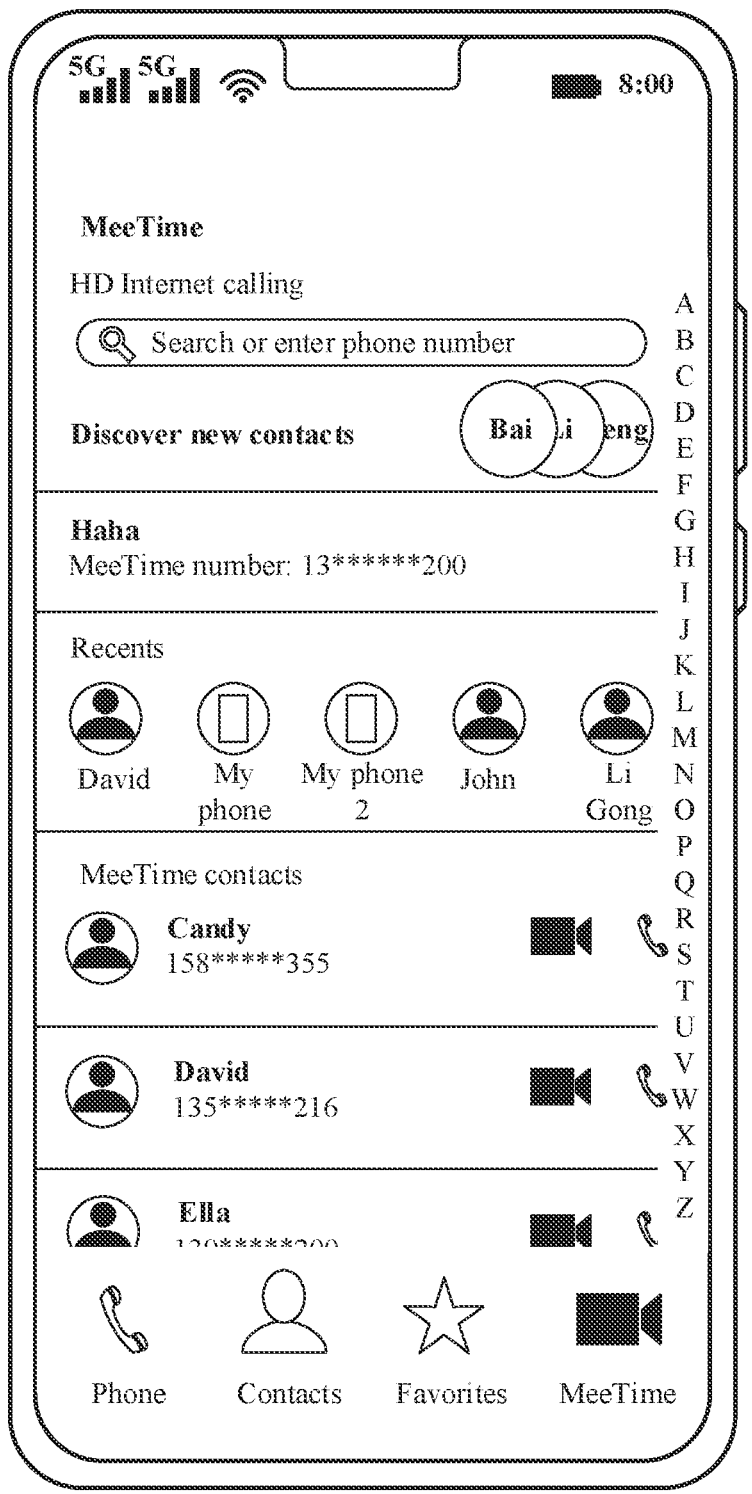

In another aspect, as shown FIG. 3(A), in an application scenario, the electronic device opens a MeeTime page shown in FIG. 3(B) in response to a touch operation of a user on the "MeeTime" control. The MeeTime page includes a contacts list "MeeTime contacts" and an index "ABCDEFGHIGKLMNOPQRSTUVWXYZ" corresponding to the "MeeTime contacts". The contacts list includes list items such as "Candy", "David", and "Ella". In addition, above the contacts list, the MeeTime page further includes a laterally slidable region "Recents". The user can search for recent call records by sliding the laterally slidable region, but the index displayed in the display interface obstructs the right side of the laterally slidable region, which affects operations of the user.

Therefore, an embodiment of this application provides an index display method. When the display interface displays a first page, a position of a first list on the first page in the display interface is determined. An index corresponding to the first list is displayed when the first list is located in a preset display region of the display interface, so that the index and the first list are synchronously displayed, thereby improving a degree of matching between an index displayed in the display interface and a list.

The index display method is applied to an electronic device. For example, the electronic device described in embodiments of this application may be a mobile phone, a tablet computer, a handheld computer, a personal digital assistant (personal digital assistant, PDA), a wearable device, or the like. A specific form/type of the electronic device is not particularly limited in the embodiments of this application.

The following uses a mobile phone as an example of the electronic device to describe an index display method provided in an embodiment of this application with reference to specific application scenarios.

Figure 4:
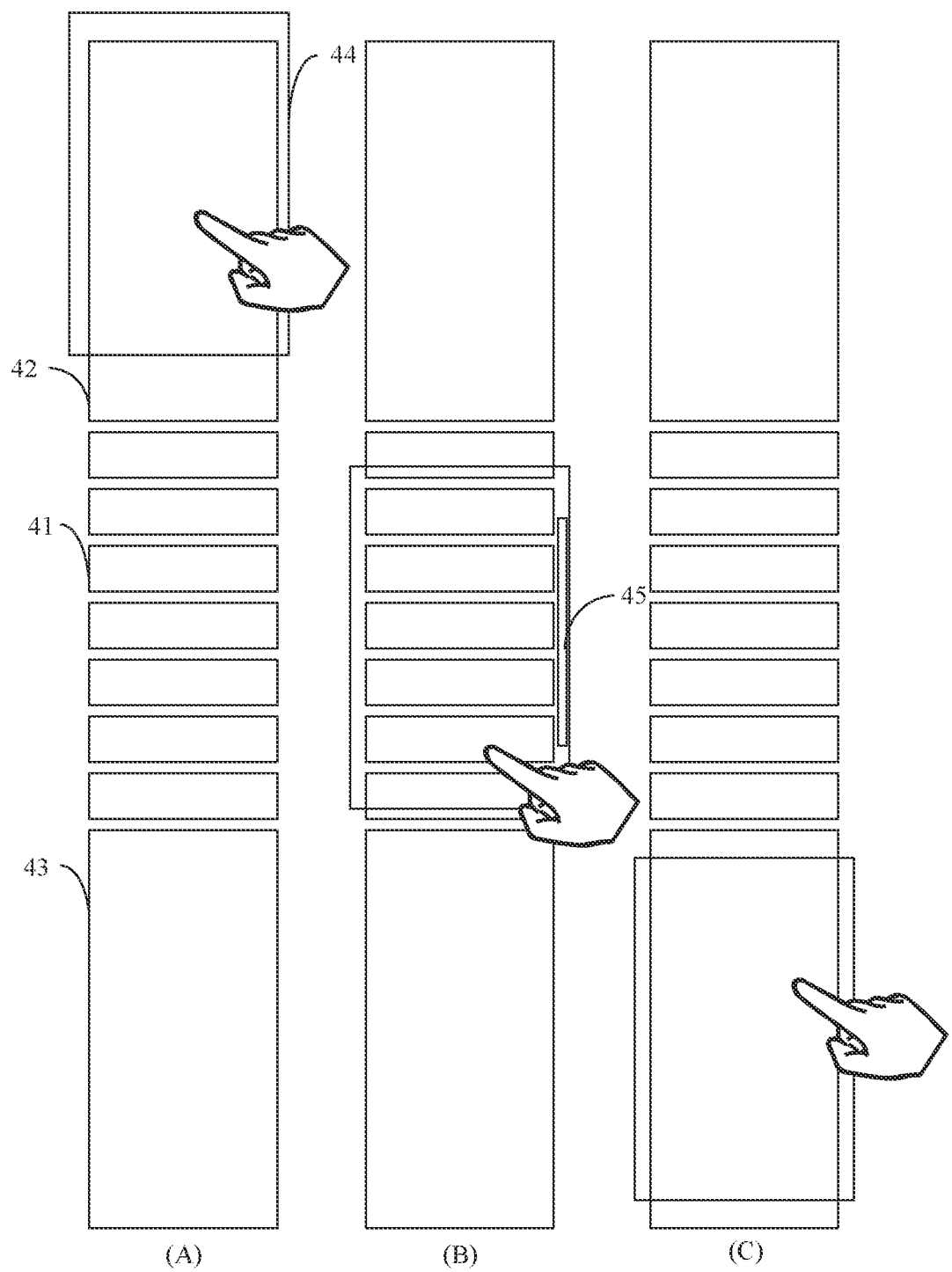
FIG. 4 is a schematic diagram of a first page according to an embodiment of this application.

As shown in FIG. 4, in an application scenario, a first page includes a first list 41, a first region 42 located above the first list 41, and a second region 43 located below the first list 41. The first list 41 is a list that meets an index use condition, that is, there is an index corresponding to the first list 41. The first region 42 and the second region 43 may display folder options, and may also display another list that does not meet the index use condition. The electronic device displays different regions of the first page in a display interface 44 in response to a sliding operation of a user. As shown in (A) in FIG. 4, the display interface displays the first region 42 and does not display the first list. In this case, the display interface does not display the index. As shown in (B) in FIG. 4, the display interface displays the first list 41, and the first list 41 is located at the top of the display interface 44. In this case, an index 45 corresponding to the first list is displayed. As shown in (C) in FIG. 4, the display interface displays the second region 43 and does not display the first list. In this case, the display interface does not display the index.

Figure 5A:
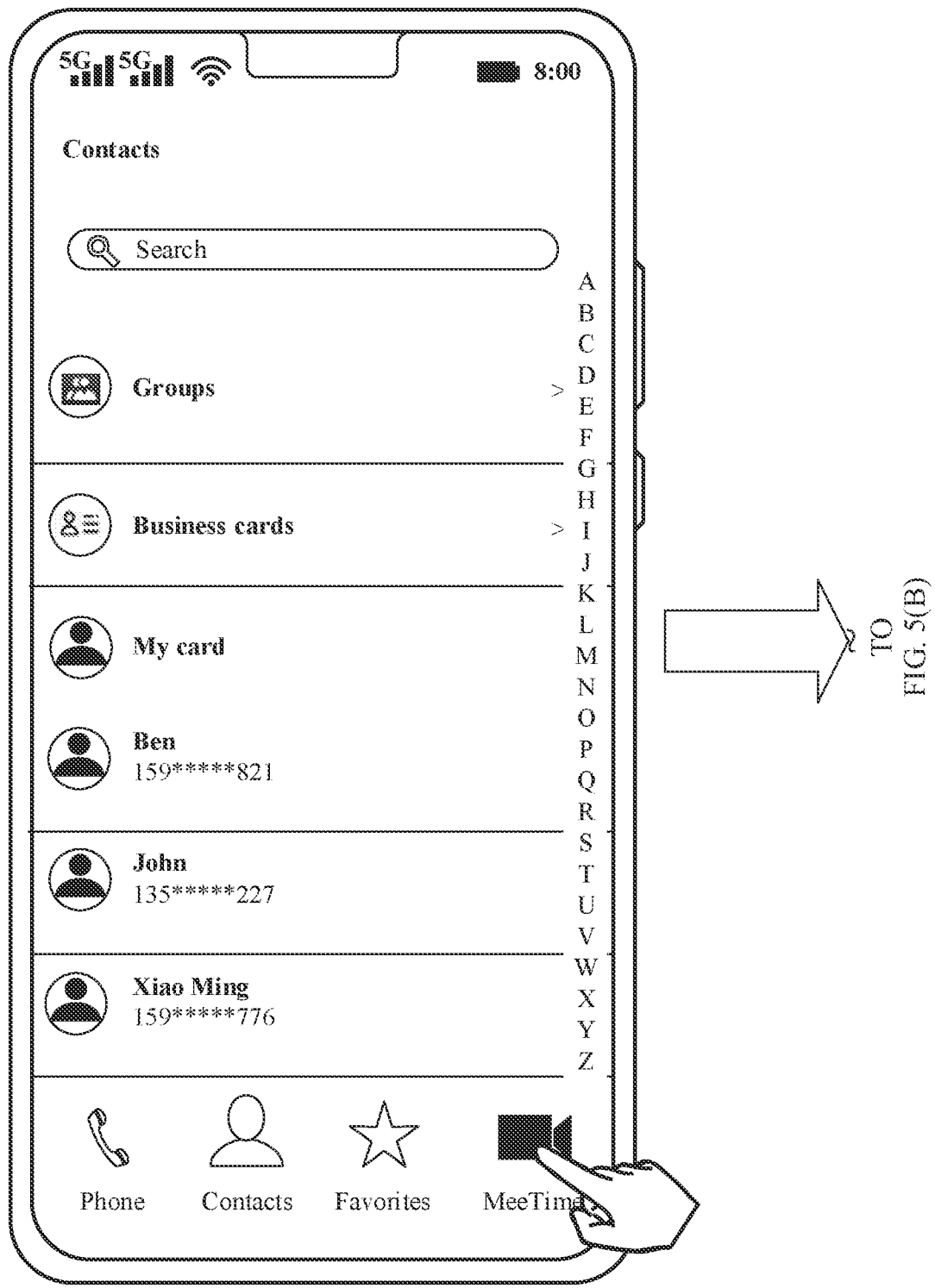
FIG. 5(A), FIG. 5(B), FIG. 5(C), and FIG. 5(D) are diagrams of an application scenario of an index display method for a first page according to an embodiment of this application.
Figure 5B:
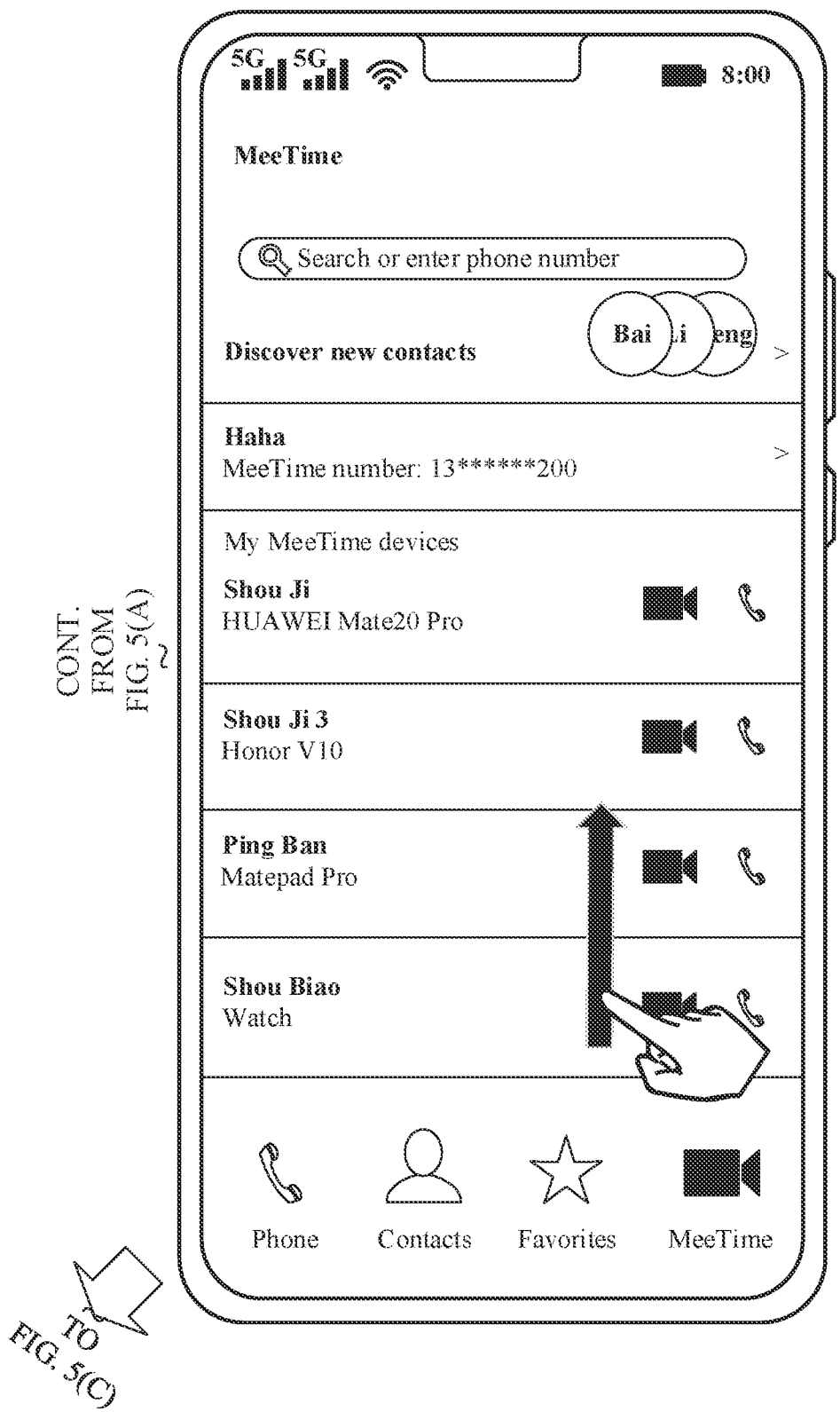
Figure 5C:
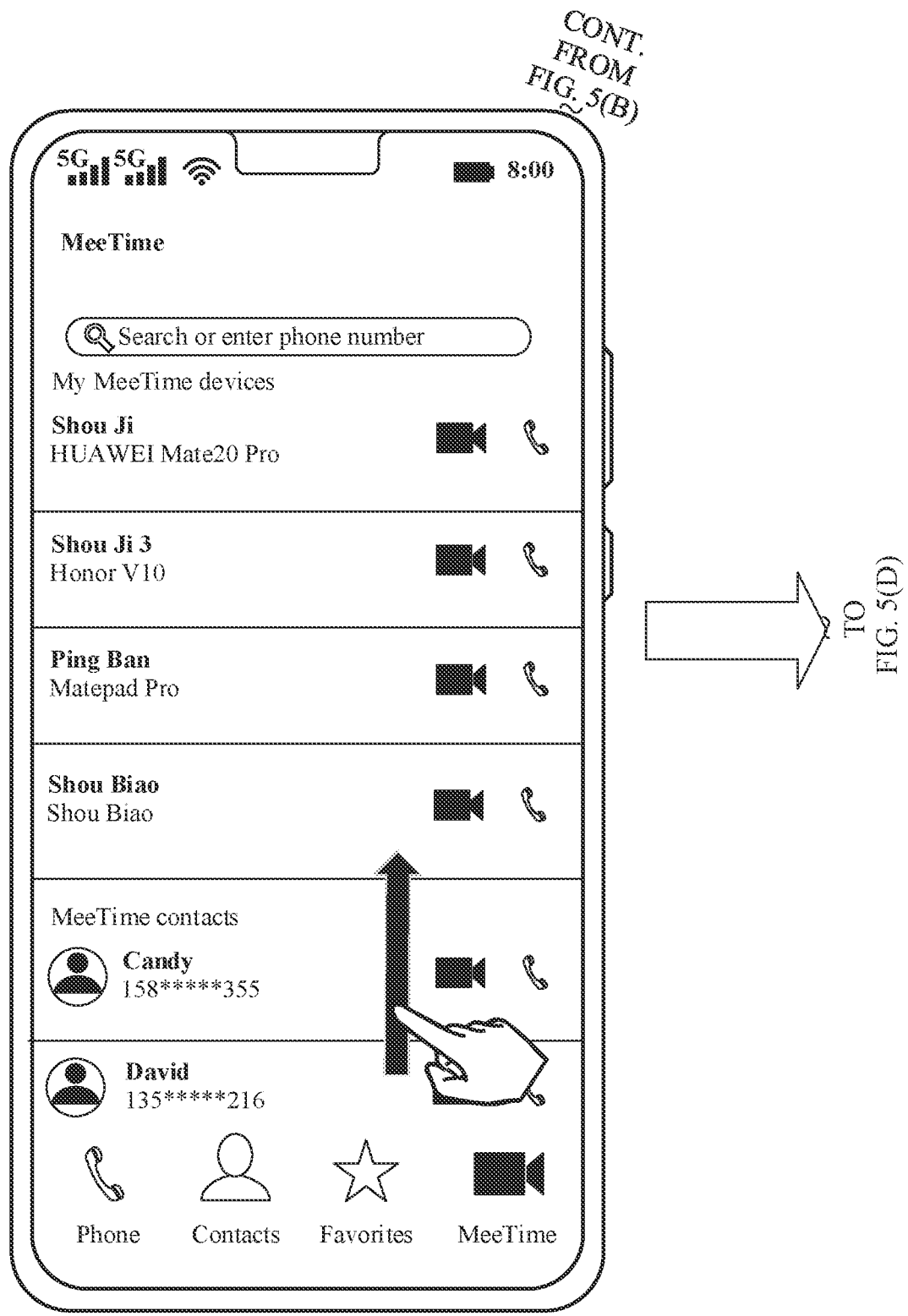
Figure 5D:
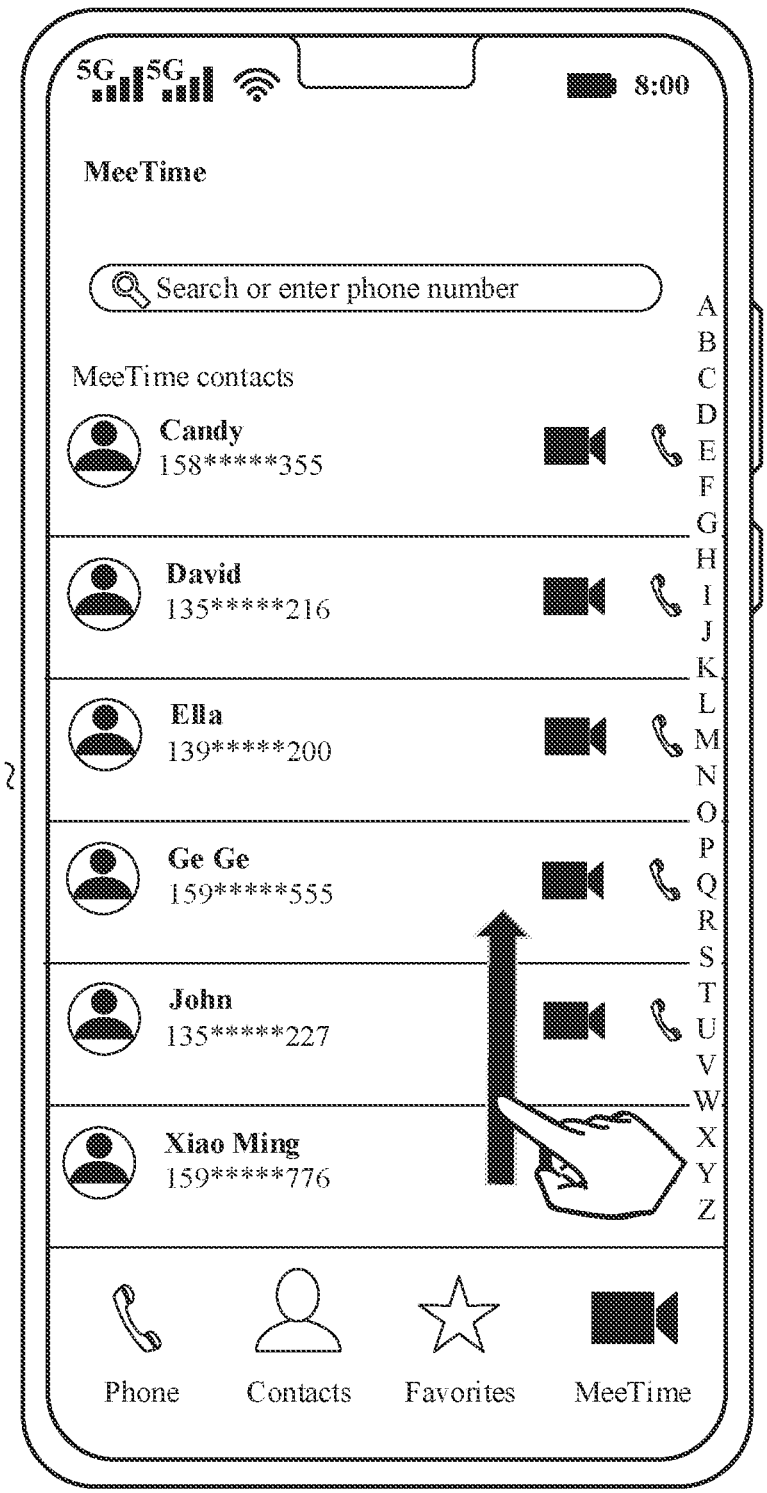

For example, as shown FIG. 5(A), in an application scenario, the electronic device opens a MeeTime page shown in FIG. 5(B) in response to a touch operation of the user on the "MeeTime" control. The MeeTime page includes the folder options: "Discover new contacts", a device list "My MeeTime devices", and the contacts list "MeeTime contacts". The device list includes list items "Shou Ji", "Shou Ji 3", "Ping Ban", and "Shou Biao". A length of the device list is less than a preset length and does not meet the index use condition. The contacts list includes list items such as "Candy", "David", and "Ella". A length of the contacts list is greater than the preset length and meets the index use condition. The contacts list is the first list. When the MeeTime page is slid to a position shown in FIG. 5(B), the display interface does not display the contacts list and does not display the index either. When the electronic device continues to slide the MeeTime page to a position shown in FIG. 5(C) in response to a sliding operation of the user, the display interface displays the contacts list, but the contacts list is not located at the top of the display interface and the index is not displayed. When the electronic device continues to slide the MeeTime page to a position shown in FIG. 5(D) in response to a sliding operation of the user, the display interface displays the contacts list, and the top of the contacts list is located at the top of the display interface. The display interface starts to display an index "ABCDEFGHIGKLMNOPQRSTUVWXYZ" corresponding to "MeeTime contacts". When the electronic device continues to slide the MeeTime page in response to a sliding operation of the user, if the contacts list is displayed at the top of the display interface, the index corresponding to "MeeTime contacts" is also displayed.

Figure 6A:
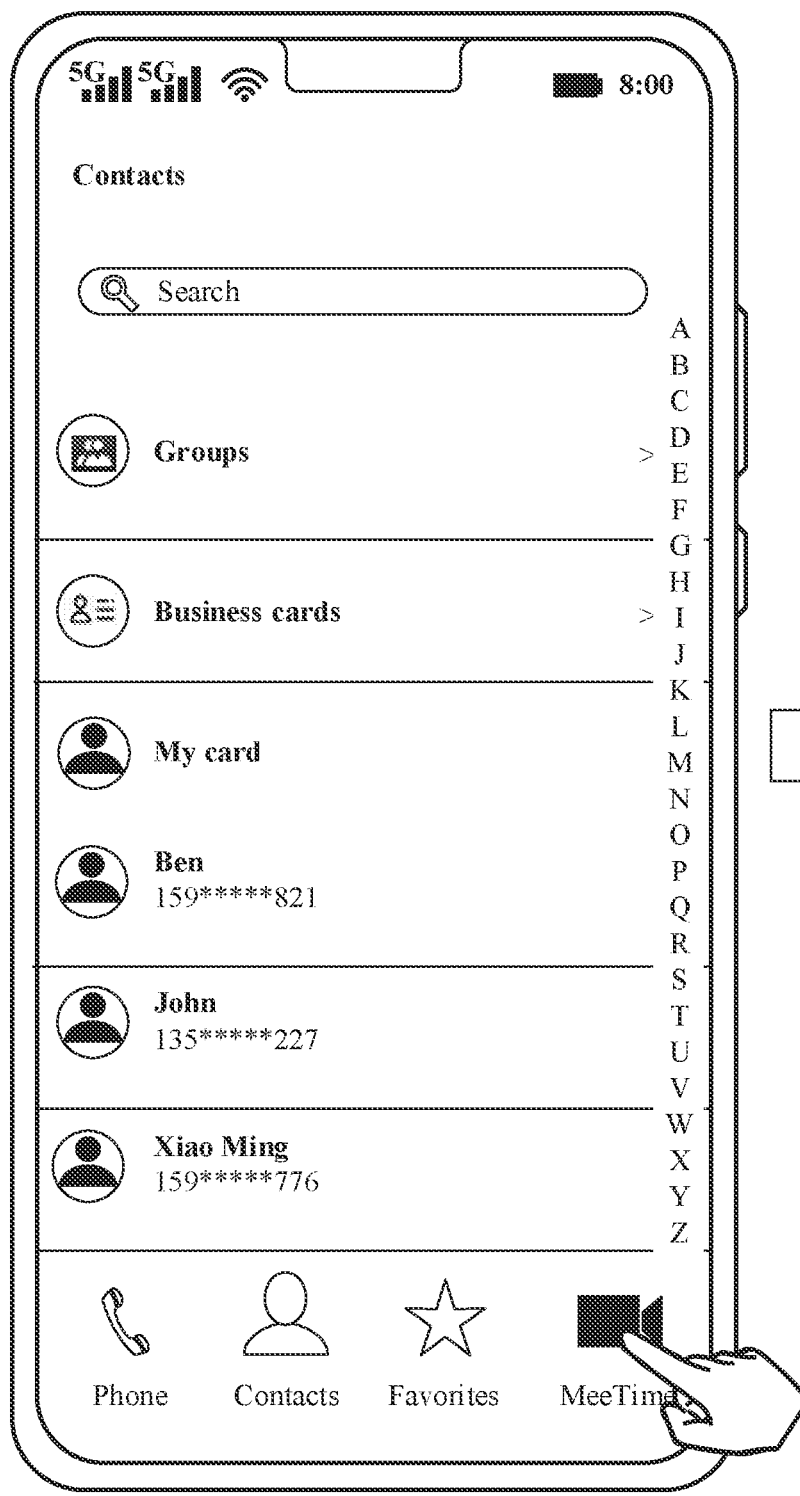
FIG. 6(A), FIG. 6(B), and FIG. 6(C) are diagrams of another application scenario of an index display method for a first page according to an embodiment of this application.
Figure 6B:
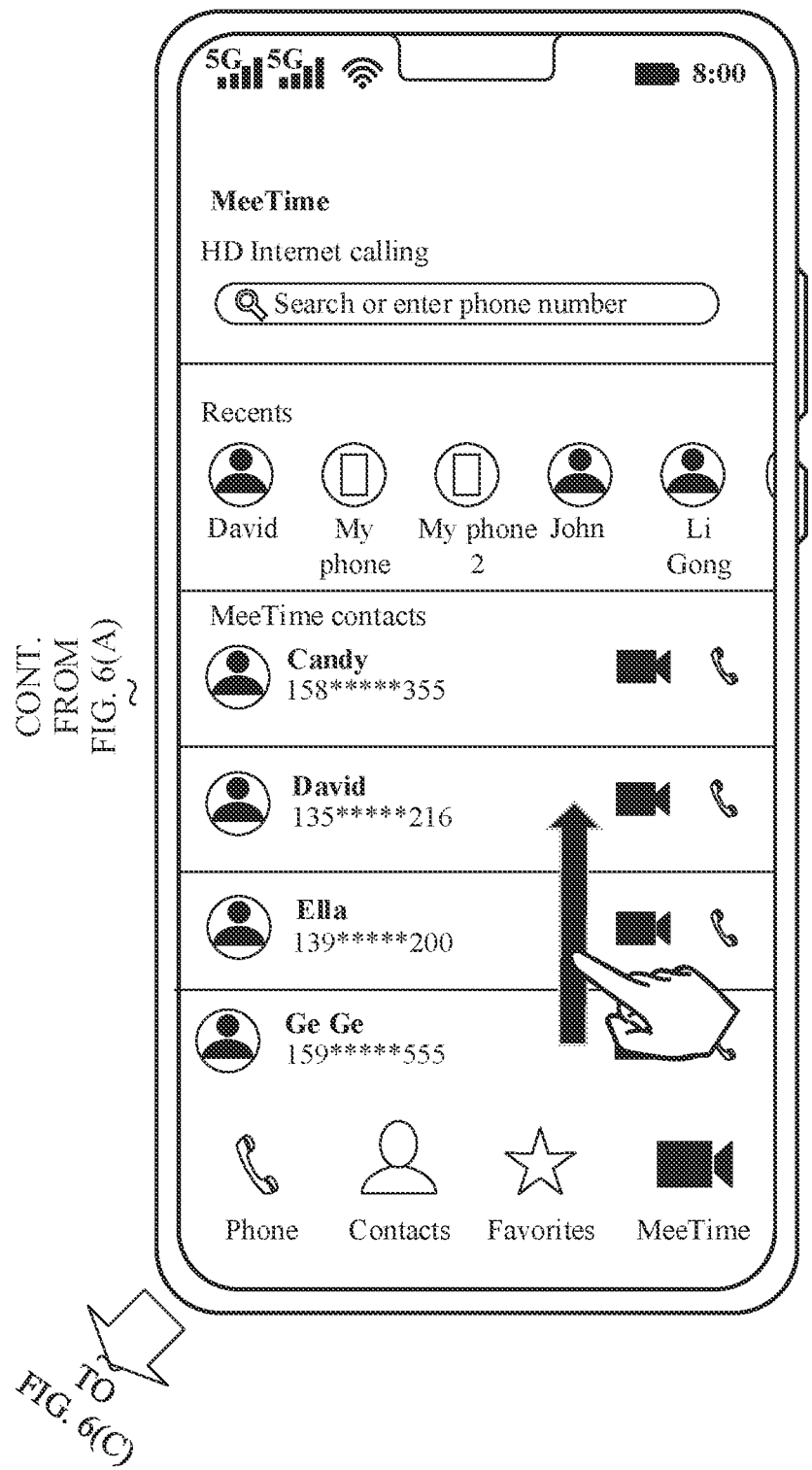
Figure 6C:
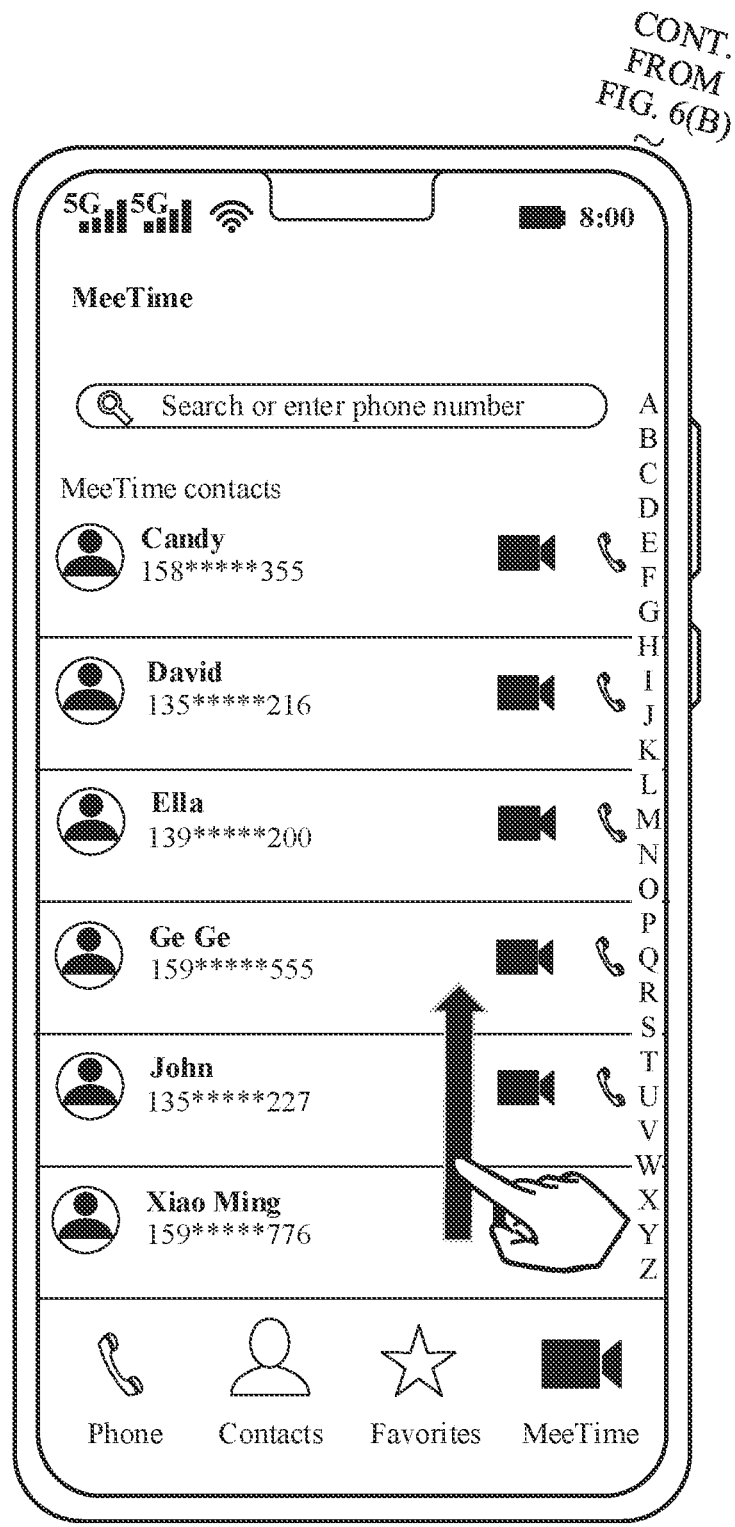

For example, as shown FIG. 6(A), in another application scenario, the electronic device opens a MeeTime page shown in FIG. 6(B) in response to a touch operation of the user on the "MeeTime" control. The MeeTime page includes a laterally slidable region "Recents" and the contacts list "MeeTime contacts". The laterally slidable region does not meet the index use condition. The contacts list includes list items such as "Candy", "David", and "Ella" and meets the index use condition. The contacts list is the first list. When the MeeTime page is slid to a position shown in FIG. 6(B), the display interface displays the laterally slidable region and the contacts list, but the contacts list is not located at the top of the display interface and the index is not displayed. When the electronic device continues to slide the MeeTime page to a position as shown in FIG. 6(C) in response to a sliding operation of the user, the top of the contacts list is located at the top of the display interface, and the display interface starts to display the index "ABCDEFGHIGKLM-NOPQRSTUVWXYZ" corresponding to "MeeTime contacts". When the electronic device continues to slide the MeeTime page in response to a sliding operation of the user, if the contacts list is displayed at the top of the display interface, the index corresponding to "MeeTime contacts" is also displayed.

Figure 7:
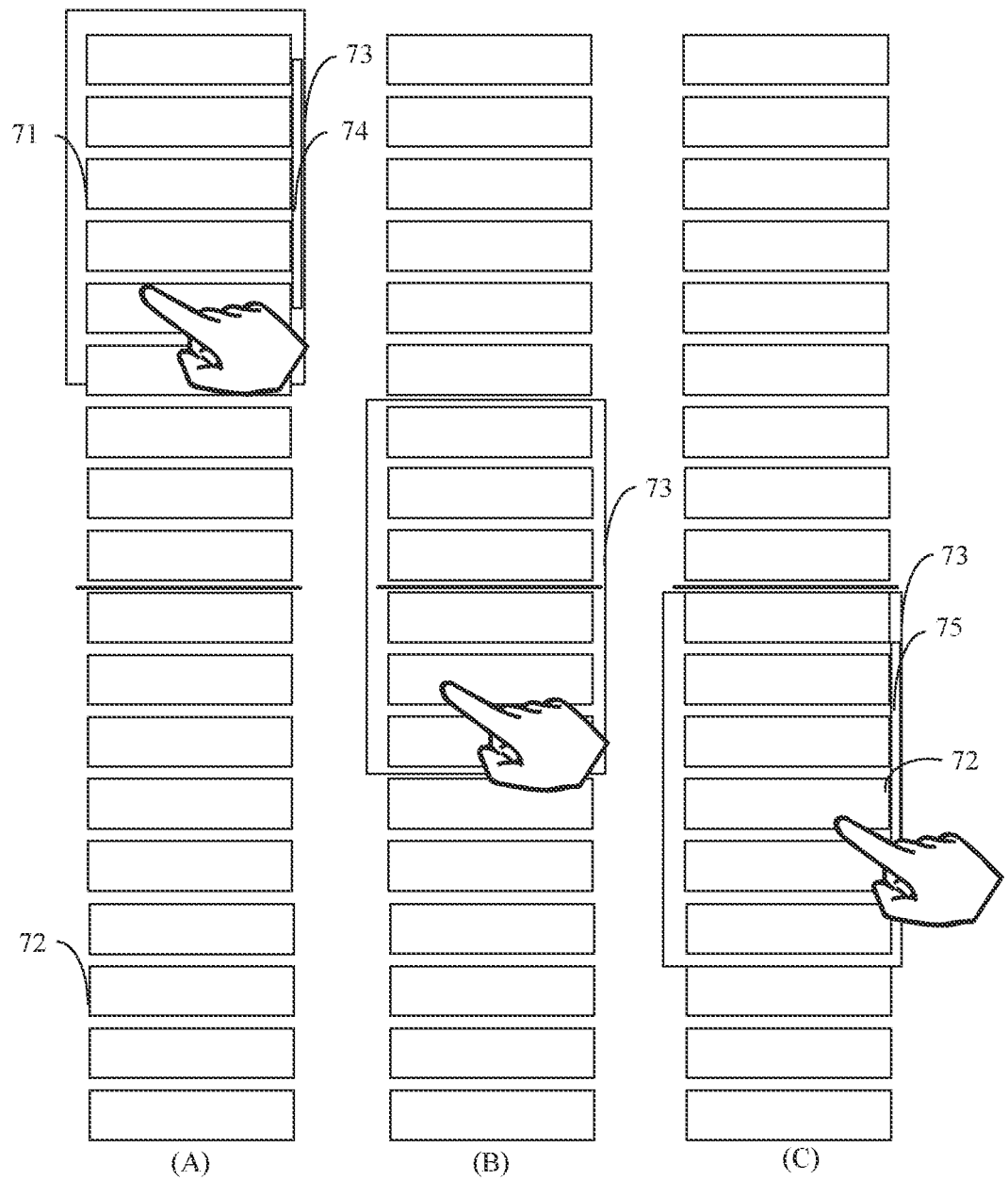
FIG. 7 is a schematic diagram of another first page according to an embodiment of this application.

As shown in FIG. 7, in another application scenario, a first page includes a first list 71 and a second list 72, and both the first list 71 and the second list 72 are lists meeting the index use condition. The electronic device displays different regions of the first page in a display interface 73 in response to a sliding operation of a user. As shown in (A) in FIG. 7, the display interface 73 displays the first list 71, and the first list 71 is located at the top of the display interface 73. An index 74 corresponding to the first list 71 is displayed in the display interface 73. As shown in (B) in FIG. 7, the display interface 73 displays both the first list 71 and the second list 72 and does not display the index. As shown in (C) in FIG. 7, the display interface 73 displays the second list 72, and the top of the second list 72 is located at the top of the display interface 73. The display interface 73 displays an index 75 corresponding to the second list 72.

Figure 8A:
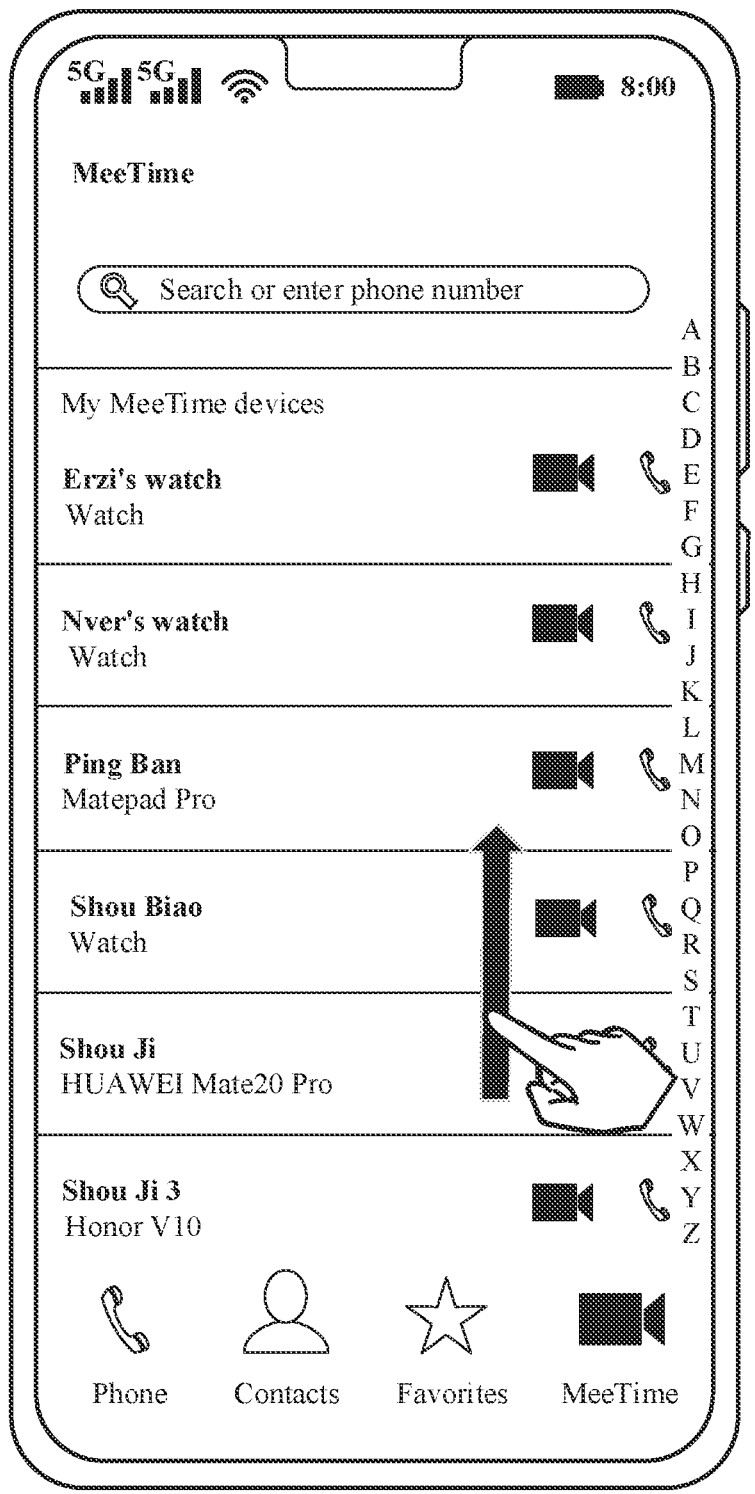
FIG. 8(A), FIG. 8(B), and FIG. 8(C) are diagrams of an application scenario of an index display method for another first page according to an embodiment of this application.
Figure 8B:
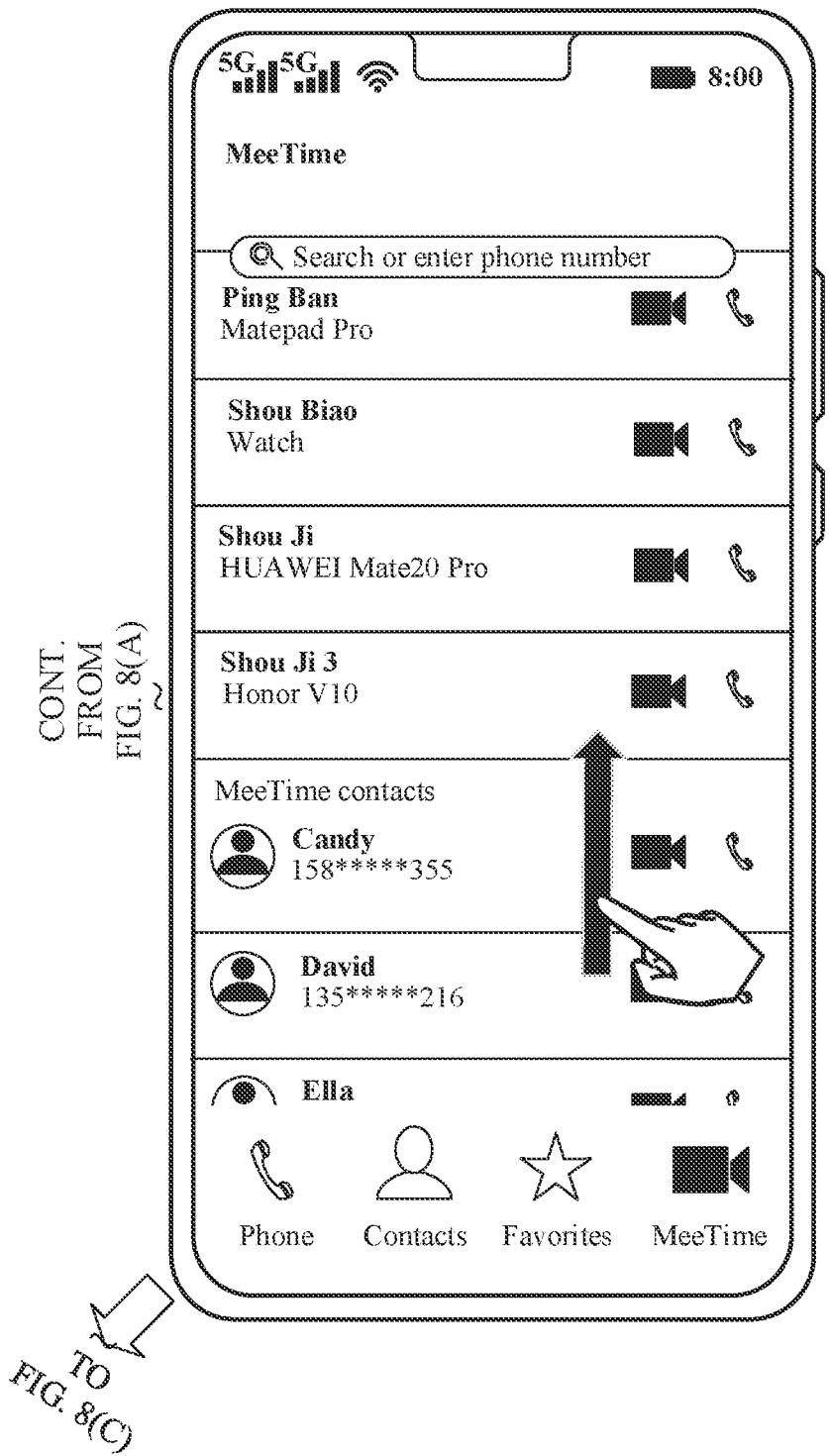
Figure 8C:
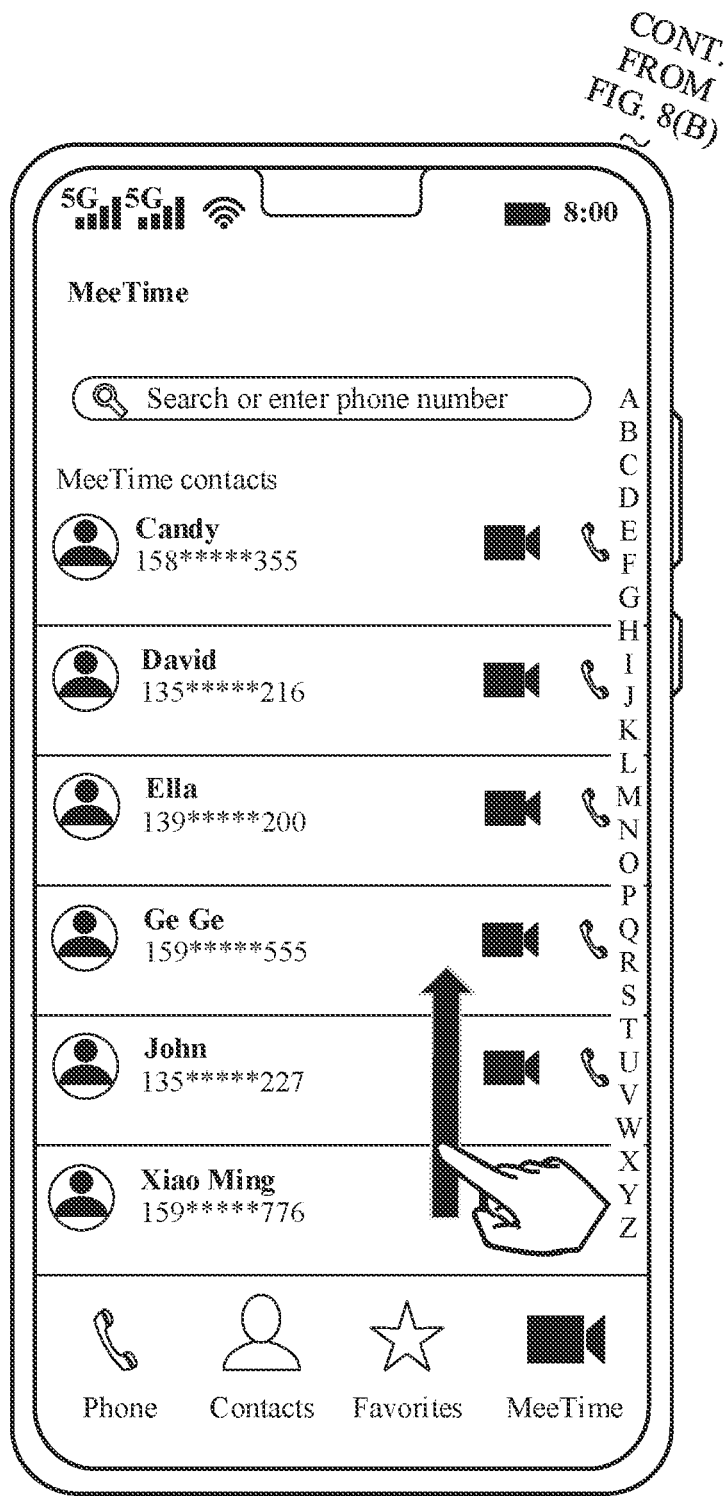

For example, as shown FIG. 8(A), FIG. 8(B), and FIG. 8(C), in an application scenario, the electronic device opens a MeeTime page in response to an operation of a user. The MeeTime page includes a device list "My MeeTime devices" and a contacts list "MeeTime contacts". The device list includes list items "Erzi's watch", "Nver's watch", and "Ping Ban". A length of the device list is greater than a preset length and meets an index use condition. The contacts list includes list items such as "Candy", "David", and "Ella". A length of the contacts list is greater than the preset length and meets the index use condition. The device list is the first list, and the contacts list is the second list. When the MeeTime page is slid to a position shown in FIG. 8(A), the display interface displays only the device list, and the device list is located at the top of the display interface. The display interface displays an index "ABCDEFGHIGKLM-NOPQRSTUVWXYZ" corresponding to "My MeeTime devices". When the electronic device continues to slide the MeeTime page to a position shown in FIG. 8(B) in response to a sliding operation of the user, the display interface displays both the device list and the contacts list, and does not display the index. When the electronic device continues to slide the MeeTime page to a position shown in FIG. 8(C) in response to a sliding operation of the user, the display interface displays only the contacts list, and the top of the contacts list is located at the top of the display interface. The display interface starts to display an index "ABCDEFGHIGKLMNOPQRSTUVWXYZ" corresponding to "MeeTime contacts". When the electronic device continues to slide the MeeTime page in response to a sliding operation of the user, if the contacts list is displayed at the top of the display interface, the index corresponding to "MeeTime contacts" is also displayed.

Figure 9A:
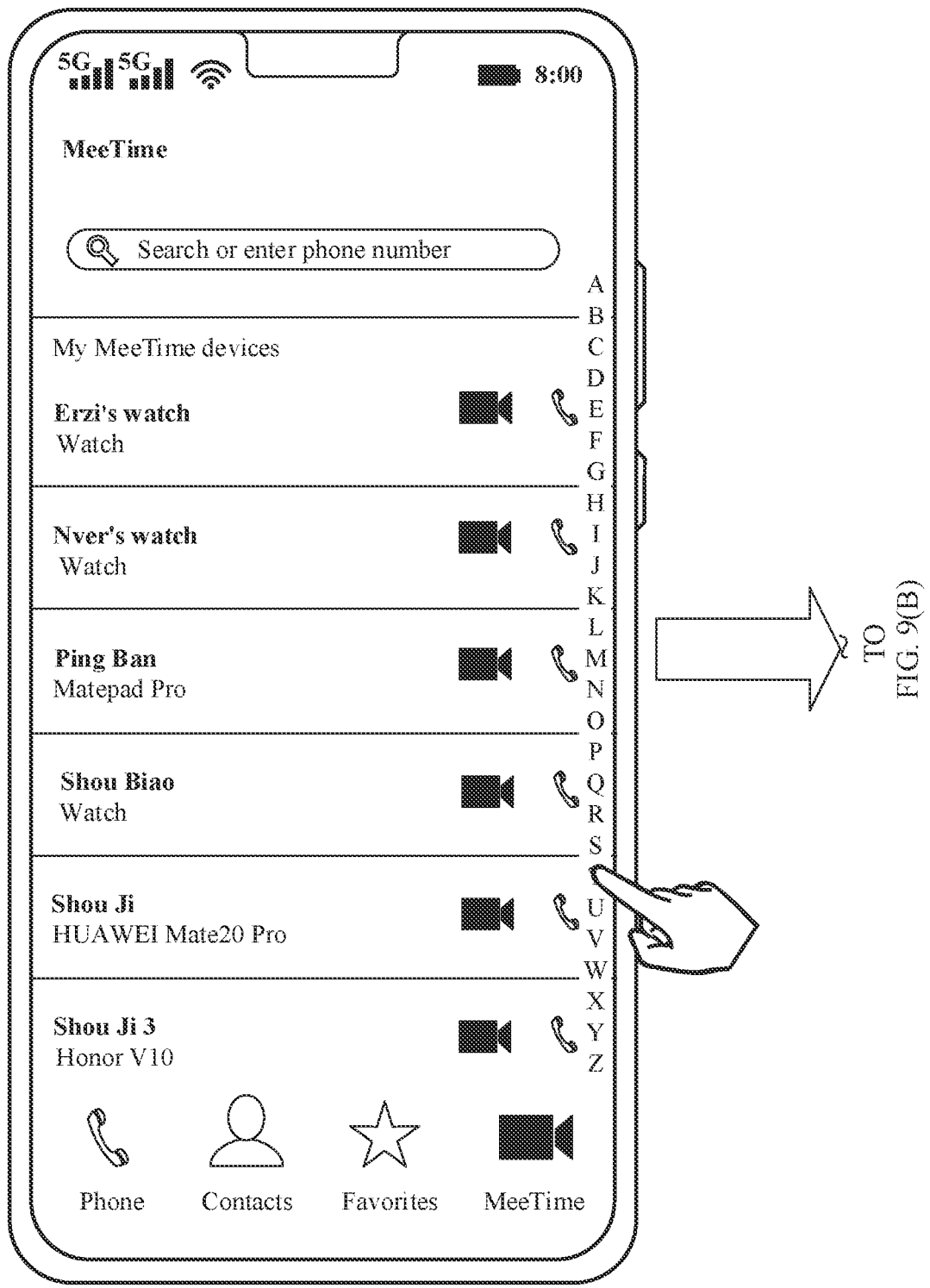
FIG. 9 is a diagram of another application scenario of an index display method for another first page according to an embodiment of this application.
Figure 9B:
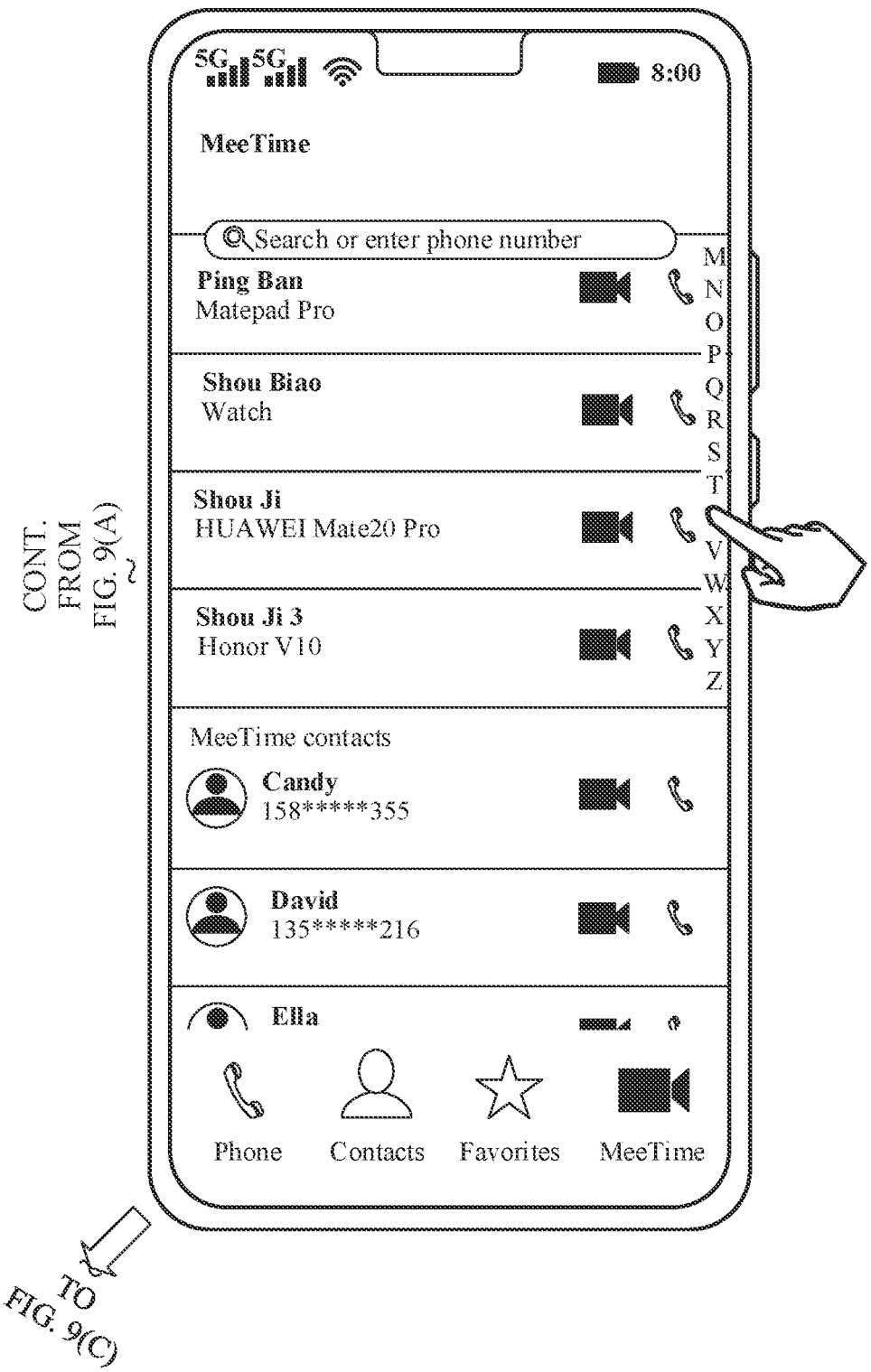
Figure 9C:
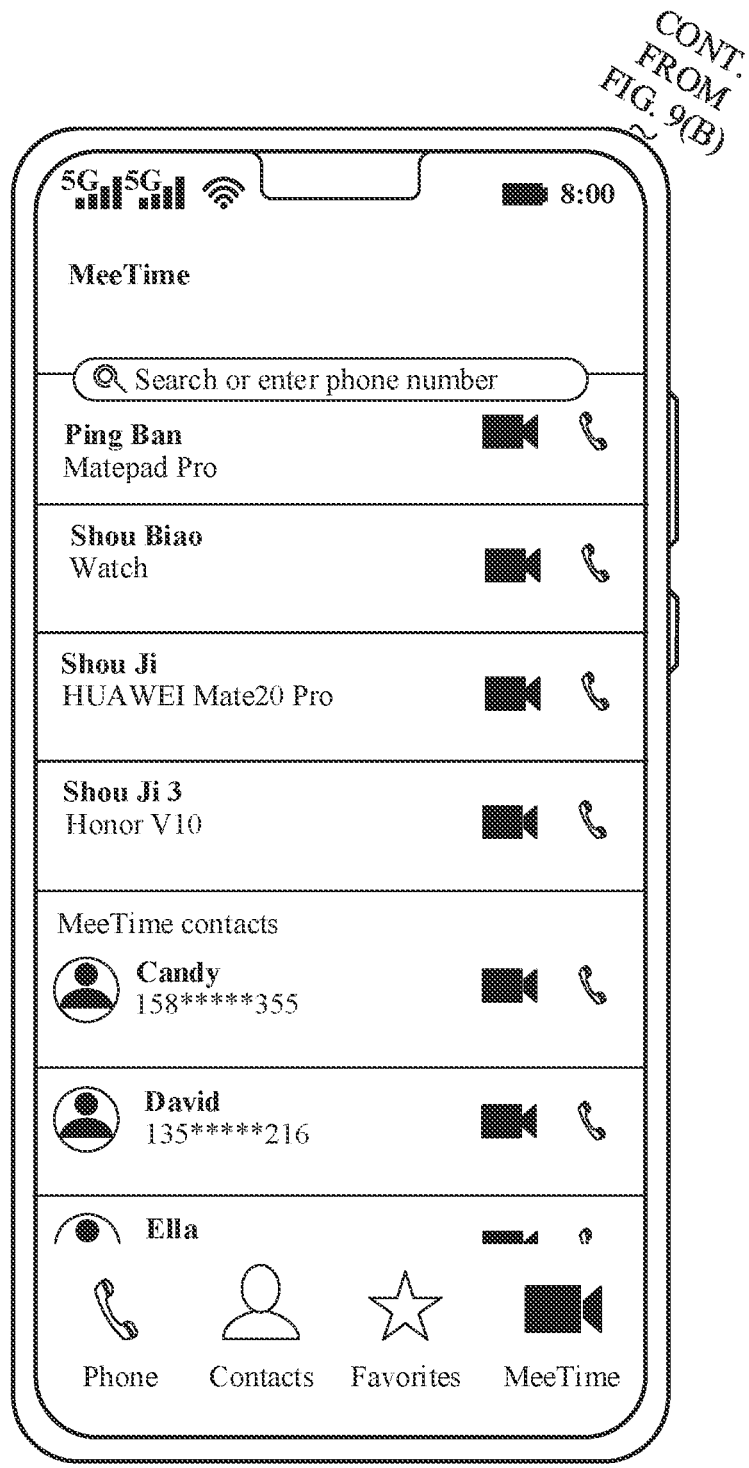

As shown FIG. 9, in another application scenario, the electronic device opens a MeeTime page in response to an operation of a user. The MeeTime page includes a device list "My MeeTime devices" and a contacts list "MeeTime contacts". The device list includes list items "Erzi's watch", "Nver's watch", and "Ping Ban". A length of the device list is greater than a preset length and meets an index use condition. The contacts list includes list items such as "Candy", "David", and "Ella". A length of the contacts list is greater than the preset length and meets the index use condition. The device list is the first list, and the contacts list is the second list. When the MeeTime page is slid to a position shown in FIG. 9(A), the display interface displays only the device list, and the device list is located at the top of the display interface. The display interface displays an index "ABCDEFGHIGKLMNOPQRSTUVWXYZ" corresponding to "My MeeTime devices". The index corresponding to "My MeeTime devices" is a slidable index, that is, the user can slide the device list by sliding the index. When the electronic device slides the index and the device list to a position shown in FIG. 9(B) in response to a sliding operation of the user on the index, the display interface displays both the device list and the contacts list. When the user does not release the hand, the display interface still displays the index corresponding to "My MeeTime devices", as shown in FIG. 9(C). When the user releases the hand after the sliding operation is complete, the display interface does not display the index.

Figure 10:
FIG. 10 is a diagram of still another application scenario of an index display method according to an embodiment of this application.

As shown FIG. 10, in an application scenario, the electronic device opens a MeeTime page in response to an operation of a user. The MeeTime page includes at least a contacts list "MeeTime contacts", and a length of the contacts list is greater than a preset length and meets an index use condition. When the electronic device slides the MeeTime page to a position shown in FIG. 10 in response to a sliding operation of the user, the top of the contacts list is located at the top of the display interface. The display interface displays list items "Candy", "David", "Ella", "Ge Ge", "John", and "Xiao Ming" and displays an index "CDEGJX" corresponding to the list items. The index "CDEGJX" includes some index labels of an original index "ABCDEFGHIGKLMNOPQRSTUVWXYZ". The list item "Candy" corresponds to an index label "C". The list item "David" corresponds to an index label "D". The list item "Ella" corresponds to an index label "E". The list item "Ge Ge" corresponds to an index label "G". The list item "John" corresponds to an index label "J". The list item "Xiao Ming" corresponds to an index label "X". In other words, only index labels corresponding to the list items displayed in the display interface are displayed, so that a spacing between the index labels is relatively large, thereby improving operation convenience for users.

Figure 11:
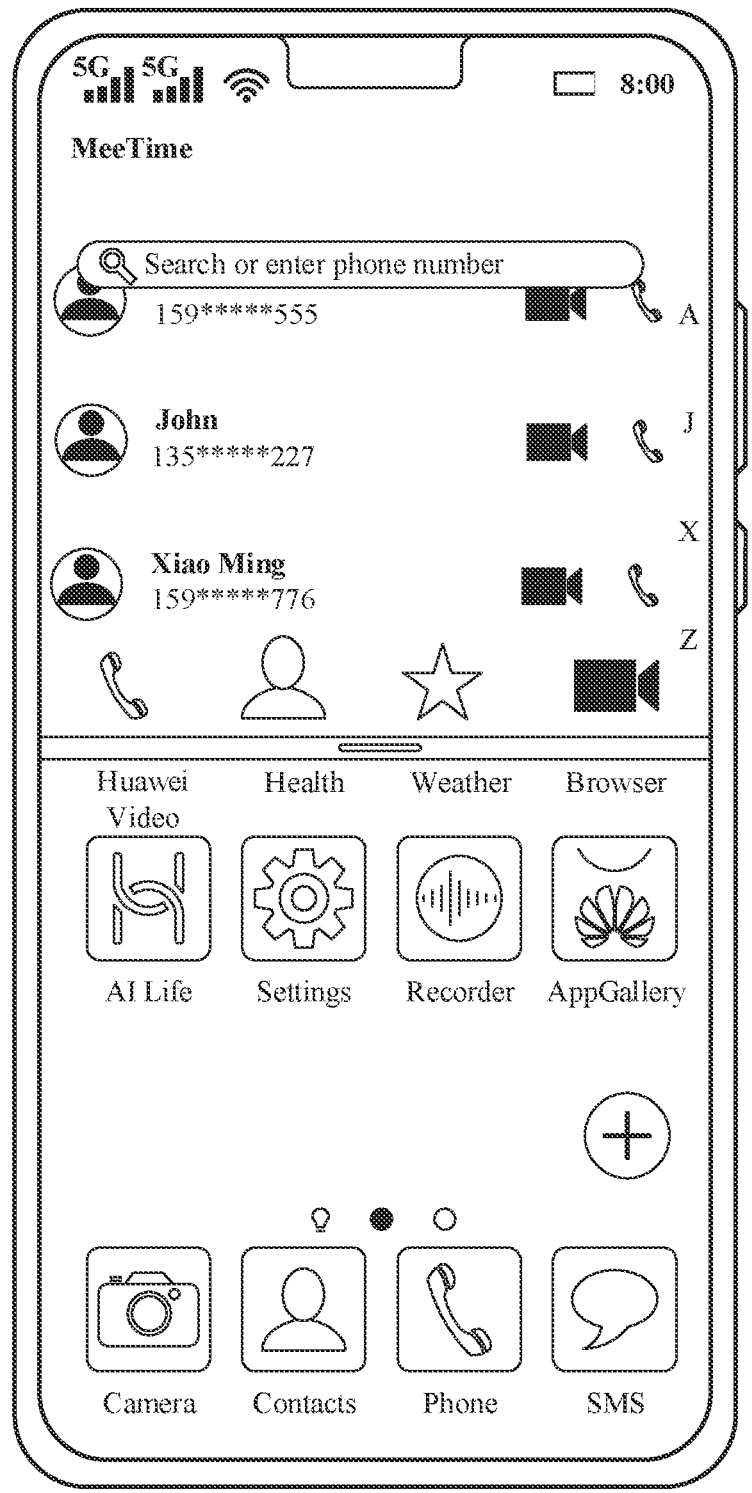
FIG. 11 is a diagram of still another application scenario of an index display method according to an embodiment of this application.

As shown in FIG. 11, in an application scenario, a display interface is in a split-screen display state, a first screen of the display interface displays a MeeTime page, and a second screen of the display interface displays a main page. The MeeTime page includes at least a contacts list, and a length of the contacts list is greater than a preset length and meets an index use condition. When the electronic device slides the MeeTime page to a position shown in FIG. 11 in response to a sliding operation of a user, the contacts list is located at the top of the display interface. The display interface displays list items "John" and "Xiao Ming" and displays an index "AJXZ" corresponding to the list items. The index "AJXZ" includes some index labels of an original index "ABCDEFGHIGKLMNOPQRSTUVWXYZ". The index label "A" is the first letter of the original index. The index label "Z" is the last letter of the original index. The list item "John" corresponds to an index label "J". The list item "Xiao Ming" corresponds to an index label "X". In other words, when the display interface is in the split-screen display state and the original index cannot be completely displayed in the display interface, the display interface displays only index labels corresponding to the list items displayed in the display interface, and the first index label and the last index label of the original index.

Figure 12:
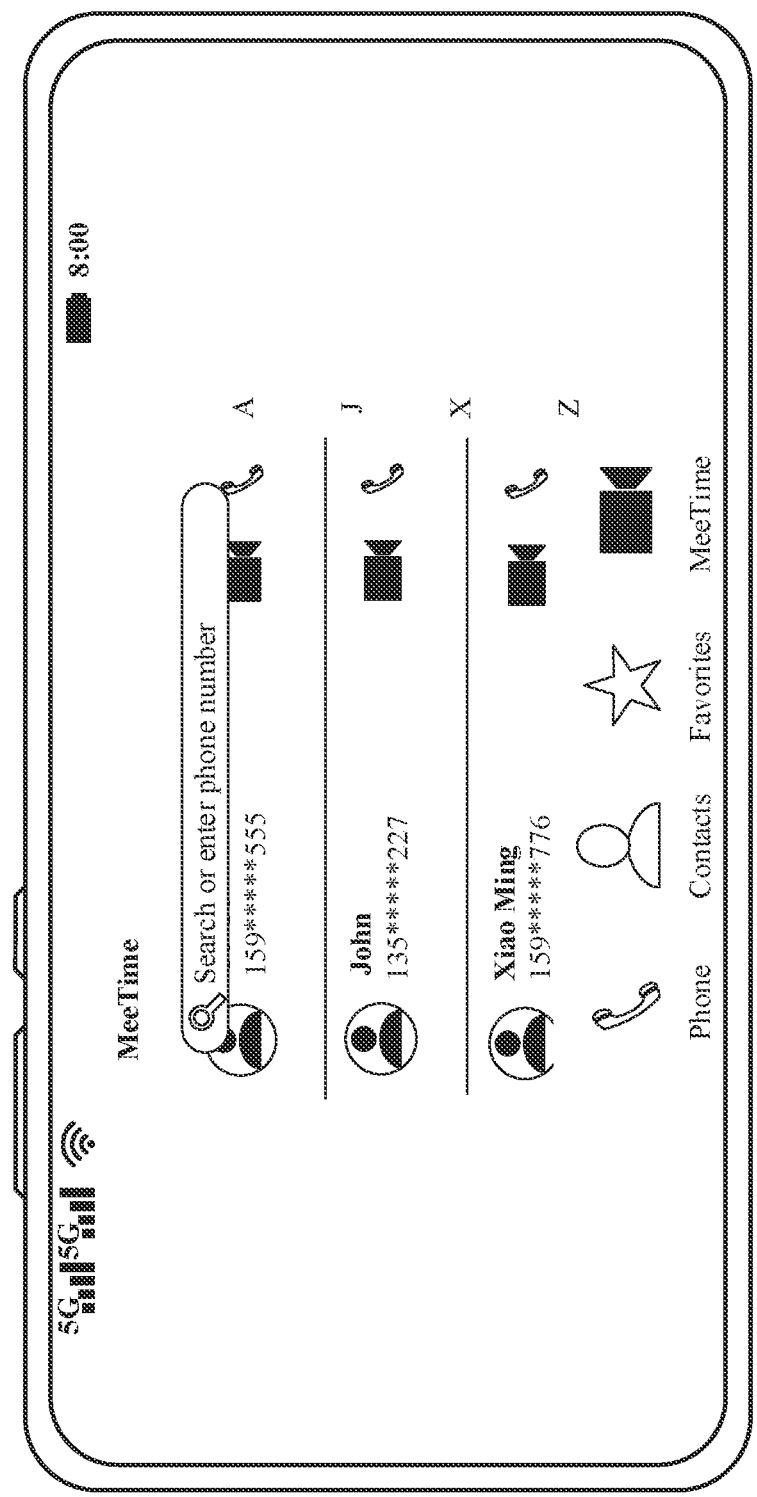
FIG. 12 is a diagram of still another application scenario of an index display method according to an embodiment of this application.

As shown in FIG. 12, in another application scenario, a display interface is in a landscape-screen display state, and the display interface displays a MeeTime page. When the electronic device slides the MeeTime page to a position shown in FIG. 12 in response to a sliding operation of a user, the display interface displays list items "John" and "Xiao Ming" and displays an index "AJXZ" corresponding to the list items.

Figure 13:
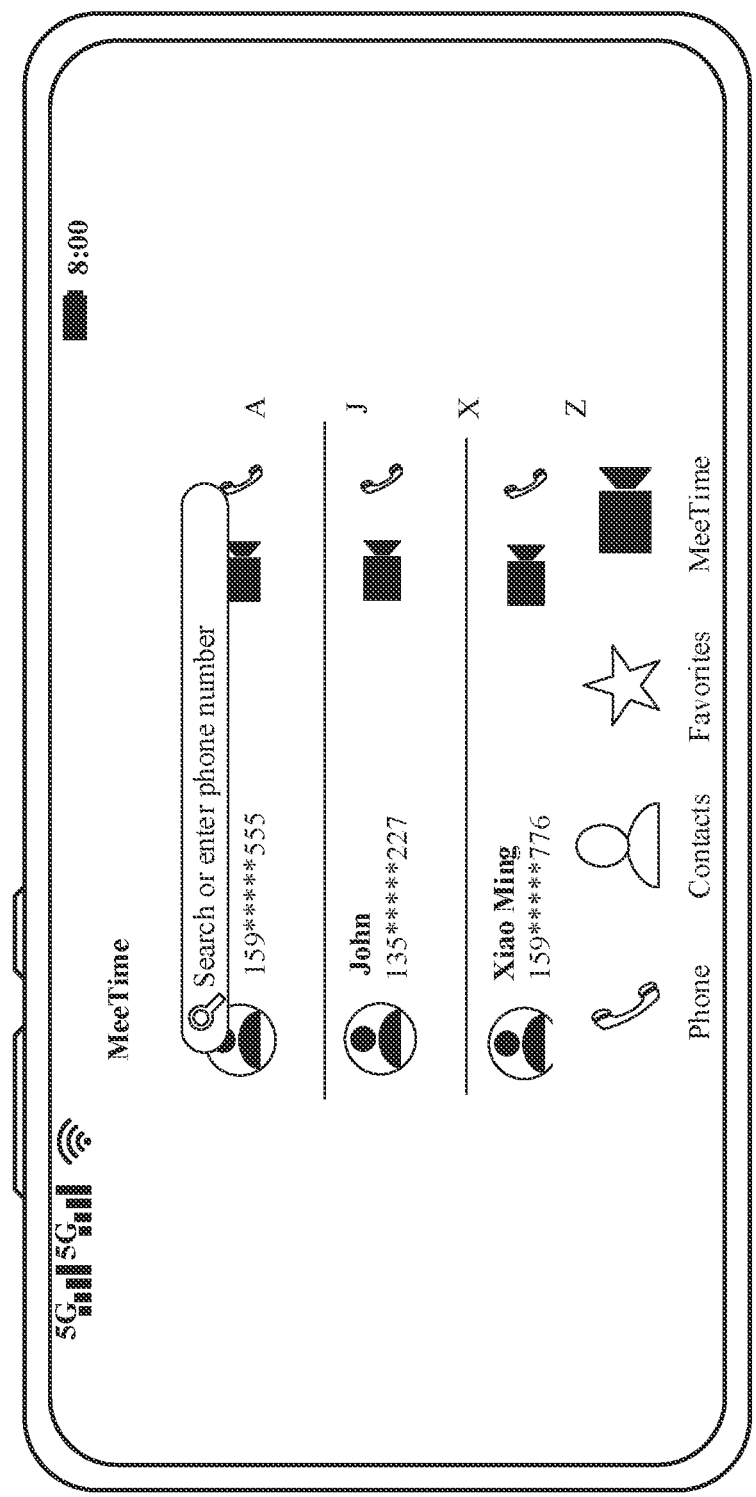
FIG. 13 is a diagram of still another application scenario of an index display method according to an embodiment of this application.

As shown in FIG. 13, in another application scenario, a display interface is in a landscape-screen display state, and the display interface displays a MeeTime page. When the electronic device slides the MeeTime page to a position shown in FIG. 13 in response to a sliding operation of a user, the display interface displays list items "John" and "Xiao Ming" and displays an index "A.J.X.Z" corresponding to the list items. Compared with an original index, there are omitted letters between every two letters, and an ellipsis identifier "." is added between every two letters.

In other feasible implementations, if the display interface is in a multi-window display state and the original index cannot be completely displayed in the display interface, the display interface displays only index labels corresponding to the list items displayed in the display interface, and the first index label and the last index label of the original index.

Figure 14:
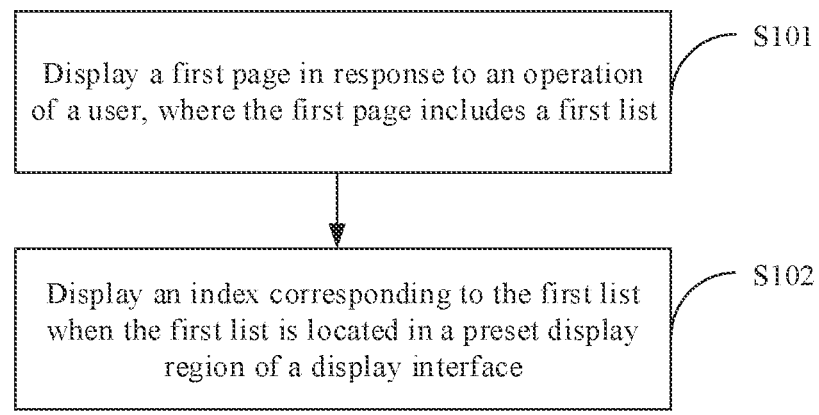
FIG. 14 is a schematic flowchart of an index display method according to an embodiment of this application.

The following describes an index display method provided in an embodiment of this application with reference to the foregoing scenarios. As shown in FIG. 14, the index display method provided in this embodiment of this application includes the following steps.

S101: Display a first page in response to an operation of a user, where the first page includes a first list.

The first list includes at least one list item, and the list item may be a contact, a setting option, or a billing option. A length of the first page is greater than or equal to a length of the first list. In addition to the first list, the first page may further include another list or a non-list region. For example, the non-list region may be an option such as a folder option "Top", "Favorites", or "Groups". An electronic device displays different regions of the first page in a display interface in response to a tapping or sliding operation of the user.

S102: Display an index corresponding to the first list when the first list is located in a preset display region of a display interface.

The index includes at least one index label, and the index label may be a letter, a Chinese character, a digit, a symbol, or the like. Each list item corresponds to one index label, and the index label corresponding to the list item may be the first character of the list item, the first letter of the first character of the list item, or the like. The preset display region of the display interface may be the top of the display interface.

Specifically, when any position of the first list is located at the top of the display interface, the display interface displays the index corresponding to the first list; otherwise, the display interface does not display the index. For example, if the first page includes the first list and a non-list region above the first list, during a sliding process of the first page, if the first list is not displayed in the display interface, or the first list is not slid to the top of the display interface, the display interface does not display the list. If the top of the first list is slid to the top of the display interface, the index starts to be displayed. If the first page continues to be slid upward and the first list is displayed in the display interface, the display interface continuously displays the index, so that both the index and the first list are displayed, thereby improving a degree of matching between an index displayed in the display interface and a list.

For example, in a scenario shown in FIG. 5(A), FIG. 5(B), FIG. 5(C), and FIG. 5(D), when a MeeTime page is slid to a position shown in FIG. 5(B), the display interface does not display a contacts list and does not display an index either. When the MeeTime page is slid to a position shown in FIG. 5(C), the display interface displays the contacts list, but the contacts list is not located at the top of the display interface and the index is not displayed. When the electronic device continues to slide the MeeTime page to a position shown in FIG. 5(D) in response to a sliding operation of the user, the display interface displays the contacts list, and the top of the contacts list is located at the top of the display interface. The display interface starts to display an index corresponding to "MeeTime contacts". For another example, in a scenario shown in FIG. 6(A), FIG. 6(B), and FIG. 6(C), when the MeeTime page is slid to a position shown in FIG. 6(B), the display interface displays the contacts list, but the contacts list is not located at the top of the display interface and the index is not displayed. When the electronic device continues to slide the MeeTime page to a position as shown in FIG. 6(C) in response to a sliding operation of the user, the top of the contacts list is located at the top of the display interface, and the display interface starts to display the index corresponding to "MeeTime contacts".

In a possible implementation, the display interface further includes a second list. If the display interface displays both the first list and the second list, the index is not displayed That the index is not displayed may be: the index is not displayed when the first page is opened, or display of the index is canceled during a sliding process of the first page.

For example, in a scenario shown in FIG. 8(A), FIG. 8(B), and FIG. 8(C), when the MeeTime page is slid to a position shown in FIG. 8(A), the display interface displays only a device list, and the device list is located at the top of the display interface. The display interface displays an index corresponding to "My MeeTime devices". When the MeeTime page is slid to a position shown in FIG. 8(B), the display interface display both the device list and the contacts list, and does not display the index. When the MeeTime page is slid to a position shown in FIG. 8(C), the display interface displays only the contacts list, and the top of the contacts list is located at the top of the display interface. The display interface starts to display the index corresponding to "Mee-Time contacts".

In another possible implementation, as shown in FIG. 9(A), FIG. 9(B), and FIG. 9(C), if the index is a slidable index and the display interface displays both the first list and the second list during a process of sliding the index by the user, the index displayed in the display interface may be not displayed. Display of the index is canceled when the user releases the hand.

In another possible implementation, the display interface further includes a laterally slidable region, and if the display interface displays both the first list and the laterally slidable region, the index is not displayed, to prevent the index from obstructing the laterally slidable region, thereby improving operation convenience for users.

In still another possible implementation, the display interface further includes a scroll bar corresponding to the first list, and if the display interface displays the scroll bar, the index is not displayed, to prevent the index from obstructing the scroll bar, thereby improving operation convenience for users.

In still another possible implementation, the electronic device determines, based on a list item displayed in the display interface, an index label displayed in the display interface. For example, when the electronic device determines the index label corresponding to the list item displayed in the display interface, only the index label corresponding to the list item displayed in the display interface is displayed, to increase a distance between the index labels, thereby facilitating operations of the user. For example, in a scenario shown in FIG. 10, index labels displayed in the display interface correspond to list items displayed in the display interface.

In still another possible implementation, the electronic device determines, based on a list item displayed in the display interface and a display status in the display interface, an index label displayed in the display interface. For example, when the display interface is in a split-screen, landscape-screen, or multi-window display state and the index cannot be completely displayed in the display interface, the display interface may display only index labels corresponding to the list items displayed in the display interface, or display index labels corresponding to the list items displayed in the display interface, and the first index label and the last index label of an original index. For example, in a scenario shown in FIG. 11, index labels displayed in the display interface include the index labels corresponding to the list items displayed in the display interface, and the first index label and the last index label of the original index.

In still another possible implementation, the electronic device determines an index display position based on a prestored text arrangement format of the first list, where the text arrangement format may be display "from left to right" or display "from right to left". The text arrangement format is associated with a language used on the page. For example, a text arrangement format for Chinese and English is generally display "from left to right", and a text arrangement format for Arabic display "from right to left". If the text arrangement format is display "from left to right", the index is displayed on the right side of the display interface; or if the text arrangement format is display "from right to left", the index is displayed on the left side of the display interface. For example, a language in this embodiment of this application is Chinese or English, and the text arrangement format is generally display "from left to right", and correspondingly, the index is displayed on the right side of the display interface.

In a possible implementation, the electronic device further determines whether the first list meets a preset condition based on list information of the first list. If the first list meets the preset condition and the first list is located in the preset display region of the display interface, the index corresponding to the first list is displayed. Specifically, the list information includes a quantity of index labels corresponding to the first list and a length of the list. If the quantity of index labels corresponding to the first list is greater than a preset value and the length of the first list is greater than a preset length, the first list meets the preset condition. It should be noted that the list information may alternatively be set to either of the quantity of index labels and the length of the list according to a user requirement. That is, if the quantity of index labels corresponding to the first list is greater than the preset value or the length of the first list is greater than the preset length, the first list meets the preset condition.

The preset value may be 2, and the preset length may be twice the length of the display interface. For example, it is assumed that the length of the list is set to k and the length of the display interface is h. If k≥2h is met and the quantity of index labels corresponding to the list is greater than 2, the preset condition is met.

In the foregoing embodiment, when the display interface displays the first page, a position of the first list on the first page in the display interface is determined. The index corresponding to the first list is displayed when the first list is located in the preset display region of the display interface, so that the index and the first list are synchronously displayed, thereby improving a degree of matching between an index displayed in the display interface and a list.

It should be understood that a sequence number of the step in the foregoing embodiment does not mean an order of execution, and an order of execution of each process should be determined by a function of the process and internal logic, and shall not constitute any limitation on an implementation process of the embodiment of this application.

Based on a same invention conception, an embodiment of this application further provides an electronic device. For example, FIG. 15 is a schematic diagram of a structure of an electronic device 100.

Figure 15:
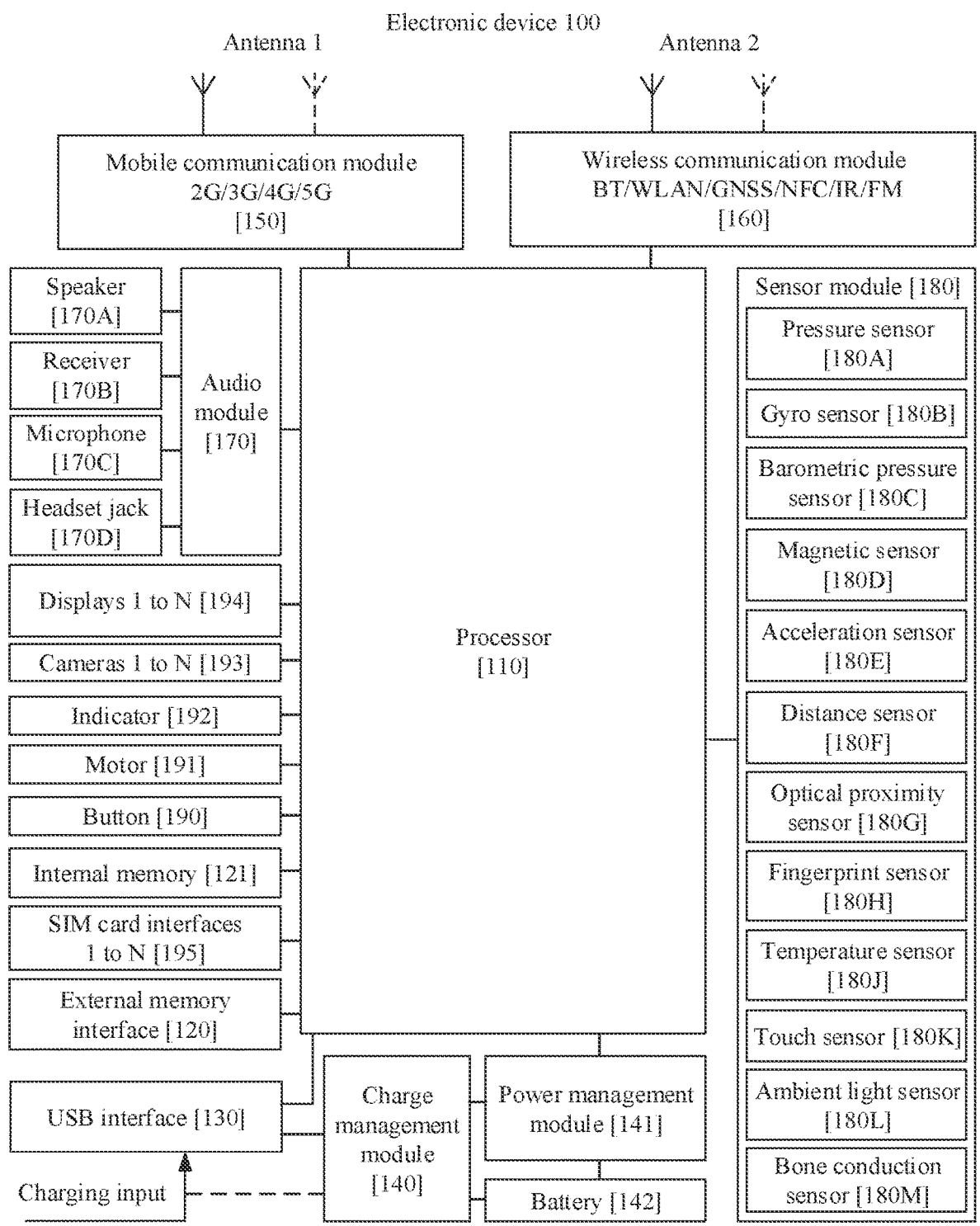
FIG. 15 is a schematic diagram of an electronic device according to an embodiment of this application.

As shown in FIG. 15, the electronic device 100 may include a processor 110, an external memory interface 120, an internal memory 121, a universal serial bus (USB) interface 130, a charge management module 140, a power management module 141, and a battery 142, an antenna 1, an antenna 2, a mobile communication module 150, a wireless communication module 160, an audio module 170, a speaker 170A, a receiver 170B, a microphone 170C, a headphone interface 170D, a sensor module 180, a button 190, a motor 191, an indicator 192, a camera 193, a display 194, and a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, and an ambient light sensor 180L, a bone conduction sensor 180M, and the like.

It can be understood that the structure illustrated in this embodiment of the present invention do not constitute a specific limitation on the electronic device 100. In some other embodiments of this application, the electronic device 100 may include more or fewer components than those shown in the figure, or combine some components, or split some components, or have a different component arrangement. The illustrated components may be implemented in hardware, software, or a combination of software and hardware.

The processor 110 may include one or more processing units. For example, the processor 110 may include an application processor (application processor, AP), a modem processor, a graphics processor (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and the like. Different processing units may be independent devices, or may be integrated in one or more processors.

The controller may generate an operation control signal based on an instruction operation code and a timing signal, to implement control on instruction fetching and execution.

A memory may be further provided in the processor 110 and configured to store instructions and data. In some embodiments, the memory in the processor 110 is a cache. The memory may store instructions or data that has just been used or is repeatedly used by the processor 110. If the processor 110 needs to use the instructions or data again, the instructions or data can be revoked directly from the memory. This avoids repeated access and reduces a waiting time of the processor 110, thereby increasing efficiency of a system.

In some embodiments, the processor 110 may include one or more interfaces. The interface may include an inter-integrated circuit (inter-integrated circuit, I$^2$C) interface, an inter-integrated circuit sound (inter-integrated circuit sound, I$^2$S) interface, a pulse code modulation (pulse code modulation, PCM) interface, a universal asynchronous receiver-transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, and/or a universal serial bus (universal serial bus, USB) interface, and the like.

The PC interface is a bidirectional synchronous serial bus, including a serial data line (serial data line, SDA) and a serial clock line (serial clock line, SCL). In some embodiments, the processor 110 may include a plurality of I$^2$C buses. The processor 110 may be respectively coupled to the touch sensor 180K, a charger, a camera flash, the camera 193, and the like through different I$^2$C bus interfaces. For example, the processor 110 may be coupled to the touch sensor 180K through the I2C interface, so that the processor 110 and the touch sensor 180K communicate with each other through the I2C bus interface, thereby implementing a touch function of the electronic device 100.

The I$^2$S interface may be used for audio communication. In some embodiments, the processor 110 may include a plurality of I$^2$S buses. The processor 110 may be coupled to the audio module 170 through the I$^2$S bus to implement communication between the processor 110 and the audio module 170. In some embodiments, the audio module 170 may transmit an audio signal to the wireless communication module 160 through the PS interface, so as to implement a function of answering calls through a Bluetooth headset.

The PCM interface may also be used for audio communication, and may perform sampling, quantizing, and encoding on an analog signal. In some embodiments, the audio module 170 and the wireless communication module 160 may be coupled through the PCM bus interface. In some embodiments, the audio module 170 may also transmit an audio signal to the wireless communication module 160 through the PCM interface, so as to implement a function of answering calls through a Bluetooth headset. Both the I2S interface and the PCM interface may be used for audio communication.

The UART interface is a universal serial data bus and used for asynchronous communication. The bus may be a bidirectional communication bus. It converts to-be-transmitted data between serial communication and parallel communication. In some embodiments, the UART interface is usually configured to connect to the processor 110 and the wireless communication module 160. For example, the processor 110 communicates with a Bluetooth module in the wireless communication module 160 through the UART interface to implement a Bluetooth function. In some embodiments, the audio module 170 may transmit an audio signal to the wireless communication module 160 through the UART interface, so as to implement a function of playing music through a Bluetooth headset.

The MIPI interface may be configured to connect to the processor 110 and a peripheral device such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface to implement a photographing function of the electronic device 100. The processor 110 communicates with the display 194 through the DSI interface to implement a display function of the electronic device 100.

The GPIO interface may be configured by software. The GPIO interface may be configured as a control signal or as a data signal. In some embodiments, the GPIO interface may be configured to connect to the processor 110 and the camera 193, the display 194, the wireless communication module 160, the audio module 170, the sensor module 180, and the like. The GPIO interface may be further configured as an I$^2$C interface, an I$^2$S interface, a UART interface, a MIPI interface, or the like.

The USB interface 130 is an interface that conforms to the USB standard specification, and may specifically be a mini USB interface, a micro USB interface, a USB Type-C interface, or the like. The USB interface 130 may be configured to connect to the charger to charge the electronic device 100, and may also be configured to transmit data between the electronic device 100 and a peripheral device. It may also be configured to connect to a headset, so as to play audio through the headset. The interface may also be configured to connect to another electronic device such as an AR device.

It can be understood that the interface connection relationship between modules illustrated in this embodiment of the present invention is merely an illustrative description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charge management module 140 is configured to receive a charging input from the charger. The charger may be a wireless charger or a wired charger. In some wired charging embodiments, the charge management module 140 may receive a charging input from the wired charger through the USB interface 130. In some wireless charging embodiments, the charge management module 140 may receive a wireless charging input through a wireless charging coil of the electronic device 100. At the same time when the charge management module 140 charges the battery 142, the power management module 141 may be used to supply power to the electronic device.

The power management module 141 is configured to connect to the battery 142, the charge management module 140, and the processor 110. The power management module 141 receives an input from the battery 142 and/or the charge management module 140 and supplies power to the processor 110, the internal memory 121, the display 194, the camera 193, the wireless communication module 160, and the like. The power management module 141 may be further configured to monitor parameters such as battery capacity, a battery cycle quantity, and a battery health status (leakage and impedance). In some other embodiments, the power management module 141 may also be provided in the processor 110. In some other embodiments, the power management module 141 and the charge management module 140 may also be provided in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution, applied to the electronic device 100, to wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some function modules of the mobile communication module 150 may be disposed in the same device as at least some modules of the processor 110.

The modem processor may include a modulator and a demodulator. The modulator is configured to modulate to-be-sent low frequency baseband signals into medium and high frequency signals. The demodulator is configured to demodulate a received electromagnetic wave signal into a low frequency baseband signal. Then the demodulator transmits the demodulated low frequency baseband signal to the baseband processor for processing. The low frequency baseband signal is processed by the baseband processor and then passed to the application processor. The application processor outputs a sound signal through an audio device (not limited to the speaker 170A, the receiver 170B, or the like), or displays an image or a video through the display 194. In some embodiments, the modem processor may be a separate device. In some other embodiments, the modem processor may be independent of the processor 110, and provided in a same device as the mobile communication module 150 or another function module.

The wireless communication module 160 may provide a wireless communication solution that is applied to the electronic device 100, and that includes a wireless local area network (wireless local area networks, WLAN) (for example, a wireless fidelity (wireless fidelity, Wi-Fi) network). Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service. GPRS), code division multiple access (code division multiple access. CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is opened, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on image noise, brightness, and a skin tone. The ISP may further optimize parameters, such as exposure and color temperature, of a shooting scene. In some embodiments, the ISP may be provided in the camera 193.

The camera 193 is configured to capture a static image or a video. An optical image of an object is generated through the lens, and is projected onto a photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it into a digital image signal. The ISP outputs the digital image signal to the DSP for processing. The DSP converts the digital image signal into an image signal in a format such as standard RGB or YUV. In some embodiments, the electronic device 100 may include one or N cameras 193, w % here N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, and simulates a biological neural network structure such as a transmission mode between neurons in a human brain to perform rapid process on input information, and can perform continuous self-learning. The NPU can implement applications such as intelligent cognition of the electronic device 100, for example, image recognition, facial recognition, speech recognition, and text understanding.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The internal memory 121 may include a program storage area and a data storage area. The program storage area may store an operating system, an application required for at least one function (such as a sound play function and an image play function), and the like. The data storage area may store data (such as audio data and a phone book) created based on use of the electronic phone 100, and the like. In addition, the internal memory 121 may include a high-speed random access memory, and may further include a non-volatile memory, for example, at least one magnetic disk storage device, a flash memory device, and a universal flash storage (universal flash storage, UFS). The processor 110 performs various function applications and data processing of the electronic device 100 by running the instructions stored in the internal memory 121 and/or instructions stored in a memory provided in the processor.

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may listen to music or answer a call in a hands-free mode through the speaker 170A.

The receiver 170B, also referred to as an "earpiece", is configured to convert an audio electrical signal into a sound signal. When a call is answered or a voice message is received through the electronic device 10, the receiver 170B may be put close to a human ear to listen to a voice.

The microphone 170C, also referred to as a "mike" or a "mic", is configured to convert a sound signal into an electrical signal. When making a call or sending a voice message, a user may make a sound by moving a human mouth close to the microphone 170C, to input the sound signal to the microphone 170C. At least one microphone 170C may be disposed in the electronic device 100. In some other embodiments, two microphones 170C may be disposed in the electronic device 100, to implement a noise reduction function, in addition to collecting the sound signal. In some other embodiments, three, four, or more microphones 170C may alternatively be disposed in the electronic device 100, to collect a sound signal, implement noise reduction, and identify a sound source, as to implement a directional recording function and the like.

The headset jack 170D is configured to connect to a wired headset. The headset jack 170D may be the USB interface 130, or may be a 3.5 mm open mobile terminal platform (open mobile terminal platform. OMTP) standard interface or a Cellular Telecommunications Industry Association of the USA (Cellular Telecommunications Industry Association of the USA, CTIA) standard interface.

The pressure sensor 180A is configured to sense a pressure signal, and can convert the pressure signal into an electrical signal. In some embodiments, the pressure sensor 180A may be disposed in the display 194. There are many types of pressure sensors 180A, such as resistive pressure sensors, inductive pressure sensors, and capacitive pressure sensors. The capacitive pressure sensor may include at least two parallel plates having conductive materials. When a force is applied to the pressure sensor 180A, a capacitance between electrodes changes. The electronic device 100 determines a strength of the pressure based on the change in capacitance. When a touch operation is performed on the display 194, the electronic device 100 detects a strength of the touch operation by using the pressure sensor 180A. The electronic device 100 may also calculate a touched position based on a detected signal of the pressure sensor 180A. In some embodiments, touch operations performed on a same touch position but with different touch operation strengths may correspond to different operation instructions. For example, when a touch operation with a touch operation strength less than a first pressure threshold is performed on a short message application icon, an instruction of viewing short messages is executed. When a touch operation with a touch operation strength greater than or equal to the first pressure threshold is performed on the short message application icon, an instruction of creating a new short message is executed.

The gyro sensor 180B may be configured to determine a motion posture of the electronic device 100. In some embodiments, angular velocities of electronic device 100 around three axes (which are x, y, and z axes) may be determined by using the gyro sensor 180B. The gyro sensor 180B may be used for image stabilization. For example, when a shutter is pressed, the gyro sensor 180B detects an angle at which the electronic device 100 jitters: calculates, based on the angle, a distance for which a lens module needs to compensate; and enables the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude by using a barometric pressure value measured by the air pressure sensor 180C to assist in positioning and navigation.

The magnetic sensor 180D includes a Hall sensor. The electronic device 100 may detect opening and closing of a flip holster by using the magnetic sensor 180D. In some embodiments, when the electronic device 100 is a flip device, the electronic device 100 may detect opening and closing of the flip by using the magnetic sensor 180D. Further, a feature such as flip-controlled automatic unlocking by may be set based on a detected opening or closing state of the holster or an opening or closing state of a flip cover.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance through infrared or laser. In some embodiments, in a shooting scenario, the electronic device 100 may use the distance sensor 180F to measure a distance to achieve fast focusing.

The optical proximity sensor 180G may include, for example, a light-emitting diode (LED) and an optical detector such as a photodiode. The light-emitting diode may be an infrared light-emitting diode. The electronic device 100 emits infrared light to the outside by using a light emitting diode. The electronic device 100 uses a photodiode to detect infrared reflected light from a nearby object. When abundant reflected light is detected, it may be determined that there is an object near the electronic device 100. When insufficient reflected light is detected, the electronic device 100 may determine that there is no object near the electronic device 100. The electronic device 100 may use the optical proximity sensor 180G to detect that a user holds the electronic device 100 close to an ear for a call, so as to automatically turn off the display to save power. The optical proximity sensor 180G may also be used in a holster mode or pocket mode for automatic unlocking and screen locking.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The ambient light sensor 180L may further cooperate with the optical proximity sensor 180G to detect whether the electronic device 100 is in a pocket, so as to prevent accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, w % ben the temperature reported by the temperature sensor 180J exceeds a threshold, the electronic device 100 reduces performance of a processor located near the temperature sensor 180J to reduce power consumption and implement thermal protection. In some other embodiments, when the temperature is lower than another threshold, the electronic device 100 heats the battery 142 to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch device". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 in a position different from that of the display 194.

The bone conduction sensor 180M may obtain a vibration signal. In some embodiments, the bone conduction sensor 180M may obtain a vibration signal from a sound vibration bone of a human body. The bone conduction sensor 180M may also be in contact with a pulse of a human body and receive a blood pressure beat signal. In some embodiments, the bone conduction sensor 180M may be disposed in a headset, to be integrated into a bone conduction headset. The audio module 170 may parse out a voice signal based on the vibration signal of the sound vibration bone obtained by the bone conduction sensor 180M, to implement a voice function. The application processor may parse out heart rate information based on the blood pressure beat signal obtained by the bone conduction sensor 180M, to implement a heart rate detection function.

The button 190 includes a power button, a volume button, and the like. The button 190 may be a mechanical button, or may be a touch-sensitive button. The electronic device 100 may receive a button input, and generate a button signal input related to user setting and function control of the electronic device 100.

The motor 191 may generate a vibration alert. The motor 191 may be used for vibration alerts for incoming calls, and may also be used for touch vibration feedback. For example, touch operations on different applications (such as photographing and audio playing) may correspond to different vibration feedback effects. For touch operations on different regions of the display 194, the motor 191 may also correspondingly generate different vibration feedback effects. Different application scenarios (such as a time reminder, information receiving, an alarm clock, and a game) may also correspond to different vibration feedback effects. The touch vibration feedback effect may be further customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support nano SIM cards, micro SIM cards, SIM cards, and the like. A plurality of cards may be inserted into a same SIM card interface 195. Types of the plurality of cards may be the same as or different. The SIM card interface 195 may also be compatible with different types of SIM cards. The SIM card interface 195 may also be compatible with an external memory card. The electronic device 100 interacts with a network through the SIM card to implement functions such as calls and data communication. In some embodiments, the electronic device 100 uses an eSIM, that is, an embedded SIM card. The eSIM card may be embedded into the electronic device 100, and cannot be separated from the electronic device 100.

It should be noted that content such as information exchange between and execution processes of the foregoing devices/units is based on a same concept as the method embodiment of this application. Therefore, for specific functions and technical effects thereof, refer to the method embodiments. Details are not described herein again.

In the foregoing embodiments, the descriptions of various embodiments have respective focuses. For a part that is not described or recorded in detail in an embodiment, reference may be made to related descriptions in other embodiments.

A person skilled in the art may clearly understand that for the purpose of convenient and brief descriptions, division into the foregoing functional unit or modules is merely used as an example for description. During actual application, the foregoing functions may be allocated to different functional unit or modules for implementation according to a requirement, that is, an internal structure of the apparatus is divided into different functional units or modules to implement all or some of the functions described above. Functional units or modules in the embodiments may be integrated into one processing unit, or each of the units may exist alone physically, or two or more units may be integrated into one unit. The integrated unit may be implemented in a form of hardware, or may be implemented in a form of a software function unit. In addition, specific names of the functional units or modules are merely for convenience of distinguishing from each other, and are not intended to limit the protection scope of this application. For specific working processes of units or modules in a system described above, refer to corresponding processes in the foregoing method embodiments. Details are not described herein again.

When the integrated unit is implemented in the form of a software function unit and is sold or used as an independent product, the integrated unit may be stored in a computer-readable storage medium. Based on such an understanding, all or a part of the procedure of the method in the foregoing embodiments of this application may be implemented by a computer program instructing relevant hardware. The computer program may be stored in a computer-readable storage medium. When the computer program is executed by a processor, the steps of the method embodiments may be implemented. The computer program includes computer program code, and the computer program code may be in the form of source code, object code, or an executable file, or in some intermediate forms, or the like. The computer-readable medium may include at least any entity or apparatus capable of carrying the computer program code to a photographing apparatus/electronic device, a recording medium, a computer memory, a read-only memory (ROM, Read-Only Memory), a random access memory (RAM, Random Access Memory), an electrical carrier signal, a telecommunication signal, or a software distribution medium, such as a USB flash drive, a mobile hard disk, a magnetic disk, or an optical disc.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions of the embodiments.

In the embodiments provided in this application, it should be understood that the disclosed apparatus/network device and method may be implemented in other manners. For example, the described apparatus/network device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. An index display method, comprising:
    displaying, on a display interface of a mobile device, a first page in response to a tapping operation of a user, wherein the first page comprises a first list and a second list, wherein a first index corresponding to the first list comprises at least one index label, and wherein the first list is a device list, and the second list is a contacts list;
    obtaining a quantity of the at least one index label and a length of the first list;
    displaying, on the display interface of the mobile device, the first index corresponding to the first list in response to (i) a first sliding operation of the user that slides a top of the first list to the top of the display interface and (ii) determining that the quantity of the at least one index label is greater than a preset value and the length of the first list is greater than a preset length;
    stopping displaying the first index in response to a second sliding operation of the user, the second sliding operation of the user causing the display interface to display both the first list and the second list; and
    displaying, on the display interface, a second index corresponding to the second list in response to a third sliding operation of the user that slides a top of the second list to the top of the display interface.

2. The method according to claim 1, wherein the first page further comprises a scroll bar, and the method further comprises:
    when the display interface displays both the first list and the scroll bar, skipping displaying the first index.

3. The method according to claim 1, wherein the first list comprises at least one list item, and an index label of the at least one index label corresponds to a list item displayed in the display interface.

4. The method according to claim 3, wherein the index label corresponds to the list item displayed in the display interface and a display status of the display interface.

5. The method according to claim 1, wherein before the displaying the first index corresponding to the first list, the method further comprises:
    determining an index display position based on a text arrangement format of the first list, wherein the text arrangement format comprises display from left to right and display from right to left; and
    correspondingly, the displaying an index corresponding to the first list comprises:
        displaying, at the index display position, the index corresponding to the first list.

6. An electronic device, comprising:
    a processor and a memory, wherein
    the memory stores program instructions; and
    the processor is configured to run the program instructions stored in the memory, to cause the electronic device to perform operations comprising:
        displaying, on a display interface of a mobile device, a first page in response to a tapping operation of a user, wherein the first page comprises a first list and a second list, wherein a first index corresponding to the first list comprises at least one index label, and wherein the first list is a device list, and the second list is a contacts list;
        obtaining a quantity of the at least one index label and a length of the first list;
        displaying, on the display interface of the mobile device, the first index corresponding to the first list in response to (i) a first sliding operation of the user that slides a top of the first list to the top of the display interface and (ii) determining that the quantity of the at least one index label is greater than a preset value and the length of the first list is greater than a preset length;
        stopping displaying the first index in response to a second sliding operation of the user, the second sliding operation of the user causing the display interface to display both the first list and the second list; and
        displaying, on the display interface, a second index corresponding to the second list in response to a third sliding operation of the user that slides a top of the second list to the top of the display interface.

7. The electronic device according to claim 6, wherein the first page further comprises a scroll bar, and the operations further comprise:
    when the display interface displays both the first list and the scroll bar, skipping displaying the first index.

8. The electronic device according to claim 6, wherein the first list comprises at least one list item, and an index label of the at least one index label corresponds to a list item displayed in the display interface.

9. The electronic device according to claim 8, wherein the index label corresponds to the list item displayed in the display interface and a display status of the display interface.

10. The electronic device according to claim 6, wherein before the displaying the first index corresponding to the first list, the operations further comprise:
    determining an index display position based on a text arrangement format of the first list, wherein the text arrangement format comprises display from left to right and display from right to left; and
    correspondingly, the displaying an index corresponding to the first list comprises:
        displaying, at the index display position, the index corresponding to the first list.

11. A non-transitory computer-readable storage medium storing a computer program, and when the computer program is executed by a processor of an electronic device, the electronic device is caused to perform operations comprising:
    displaying, on a display interface of a mobile device, a first page in response to a tapping operation of a user, wherein the first page comprises a first list and a second list, wherein a first index corresponding to the first list comprises at least one index label, and wherein the first list is a device list, and the second list is a contacts list;
    obtaining a quantity of the at least one index label and a length of the first list;
    displaying, on the display interface of the mobile device, the first index corresponding to the first list in response to (i) a first sliding operation of the user that slides a top of the first list to the top of the display interface and (ii) determining that the quantity of the at least one index label is greater than a preset value and the length of the first list is greater than a preset length:
stopping displaying the first index in response to a second sliding operation of the user, the second sliding operation of the user causing the display interface to display both the first list and the second list; and
displaying, on the display interface, a second index corresponding to the second list in response to a third sliding operation of the user that slides a top of the second list to the top of the display interface.

12. The non-transitory computer-readable storage medium according to claim 11, wherein the first page further comprises a scroll bar, and the operations further comprise:
when the display interface displays both the first list and the scroll bar, skipping displaying the first index.

13. The non-transitory computer-readable storage medium according to claim 11, wherein the first list comprises at least one list item, and an index label of the at least one index label corresponds to a list item displayed in the display interface.

14. The non-transitory computer-readable storage medium according to claim 13, wherein the index label corresponds to the list item displayed in the display interface and a display status of the display interface.

15. The non-transitory computer-readable storage medium according to claim 11, wherein before the displaying the first index corresponding to the first list, the operations further comprise:
determining an index display position based on a text arrangement format of the first list, wherein the text arrangement format comprises display from left to right and display from right to left; and
correspondingly, the displaying an index corresponding to the first list comprises:
displaying, at the index display position, the index corresponding to the first list.

\* \* \* \* \*

UNITED STATES PATENT AND TRADEMARK OFFICE
CERTIFICATE OF CORRECTION

| | | |
|---|---|---|
| PATENT NO. | : 12,449,952 B2 | Page 1 of 1 |
| APPLICATION NO. | : 17/802061 | |
| DATED | : October 21, 2025 | |
| INVENTOR(S) | : Yuzhuo Peng | |

It is certified that error appears in the above-identified patent and that said Letters Patent is hereby corrected as shown below:

In the Specification

In Column 1, In Line 10, Delete "which_claims" and insert -- which claims --.

In the Claims

In Column 23, In Line 33, In Claim 1, delete "length:" and insert -- length; --.

In Column 25, In Line 5, In Claim 11, delete "length:" and insert -- length; --.

Signed and Sealed this
Sixth Day of January, 2026

John A. Squires
*Director of the United States Patent and Trademark Office*